United States Patent
Jimmei et al.

(10) Patent No.: US 7,391,783 B2
(45) Date of Patent: *Jun. 24, 2008

(54) NETWORK NODE APPARATUS AND CONNECTION SET-UP METHOD FOR SETTING UP CUT-THROUGH CONNECTION

(75) Inventors: Tatsuya Jimmei, Kanagawa-ken (JP); Shigeo Matsuzawa, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1145 days.

This patent is subject to a terminal disclaimer.

(21) Appl. No.: 10/615,925

(22) Filed: Jul. 10, 2003

(65) Prior Publication Data

US 2004/0071135 A1    Apr. 15, 2004

Related U.S. Application Data

(62) Division of application No. 08/766,959, filed on Dec. 16, 1996, now Pat. No. 6,614,795.

(30) Foreign Application Priority Data

Dec. 20, 1995 (JP) ................................. P7-331887

(51) Int. Cl.
*H04L 12/28* (2006.01)
*H04J 3/16* (2006.01)

(52) U.S. Cl. .................... 370/400; 370/401; 370/469

(58) Field of Classification Search ......... 370/400–406, 370/395.1–395.32, 395.53, 395.54, 389, 370/392

See application file for complete search history.

(56) References Cited

U.S. PATENT DOCUMENTS

| | | | |
|---|---|---|---|
| 5,420,862 A | 5/1995 | Perlman | |
| 5,764,895 A | 6/1998 | Chung | |
| 5,892,924 A | 4/1999 | Lyon et al. | |
| 5,920,705 A | 7/1999 | Lyon et al. | |

(Continued)

FOREIGN PATENT DOCUMENTS

JP    7-50689    2/1995

(Continued)

OTHER PUBLICATIONS

Ipsilon networks, Inc., "Ipsilon Premiers First IP Switch," Ipsilon Networks, Inc. Product Brochure (Spring 1996), vol. 1, No. 1.

(Continued)

*Primary Examiner*—Steven Nguyen
(74) *Attorney, Agent, or Firm*—Finnegan, Henderson, Farabow, Garrett & Dunner, L.L.P.

(57) ABSTRACT

A set-up scheme for a cut-through connection in a network system capable of realizing a high throughput, low latency internetwork communication efficiently under an internet environment. A network node checks source/destination information of the transport layer and/or a source/destination information of the network layer of a received packet, and if the checked information satisfies a prescribed condition, determines the packet to be a trigger. Then, the network node instructs another node capable of initiating a set-up operation, which may be the network node itself, to initiate the set-up of the cut-through connection for traffic corresponding to the trigger packet.

22 Claims, 18 Drawing Sheets

U.S. PATENT DOCUMENTS

| | | | |
|---|---|---|---|
| 5,924,112 | A | 7/1999 | Barber et al. |
| 6,016,319 | A | 1/2000 | Kshirsagar et al. |
| 6,343,322 | B2 | 1/2002 | Nagami et al. |
| 6,614,795 | B1 * | 9/2003 | Jimmei et al. ............... 370/401 |

FOREIGN PATENT DOCUMENTS

| | | |
|---|---|---|
| JP | 7-273789 | 10/1995 |
| JP | 7-273803 | 10/1995 |
| JP | 8-102745 | 4/1996 |

OTHER PUBLICATIONS

Katsube et al., "Cell Switch Router—Basic Concept and Migration Scenario," Technical Report of IEICE (Mar. 1996), pp. 173-178 (includes English Abstract).

Newman et al., "Flow labeled IP: A Connectionless Approach to ATM," IEEE Comp. Soc. Press (1996), pp. 1251-1260.

Cole et al., "IP over ATM: A Framework Document," Internet Draft, <draft.ietf-ipatm-framework-doc-06> (Oct. 2, 1995), pp. 1-23.

Murayama, "A Proposal of a Wide Area Router System," Technical Report of IEICE (Oct. 1995), pp. 1-8 (includes English Abstract).

Katsube et al., "Router Architecture Extensions for ATM: Overview," Internet Draft, <draft-katsube-router-atm-overview-01.txt> (Sep. 6, 1995), pp. 1-23.

Katz et al., "NBMA Next Hop Resolution Protocol (NHRP)," Internet Draft, >draft-ietf-rolc-nhrp-04.txt> (May 1995), pp. 1-36.

"Virtual LANs Get Real," Data Communications (Mar. 1995), pp. 87-92, 94, 96, 98 and 100.

* cited by examiner

| DESTINATION IP ADDRESS | CONNECTION STATUS | TIME-OUT COUNT |
|---|---|---|
| 134·186·15·2 | Continuing | 0 |
| 189·50·37·14 | Continuing | n |
| 162·3·22·5 | Being set-up | 0 |
| 195·133·16·41 | Being set-up | m |

| DESTINATION IP ADDRESS | NEXT-HOP IP ADDRESS | TIME-OUT COUNT | LIFETIME |
|---|---|---|---|
| 134·186·15·4 | 134·186·15·4 | 2 | 5 |
| 189·50·37·14 | 162·3·22·7 | 3 | 7 |
| 195·133·12·5 | Incomplete | 4 | 5 |
| 162·3·10·5 | Insolvable | 3 | 6 |

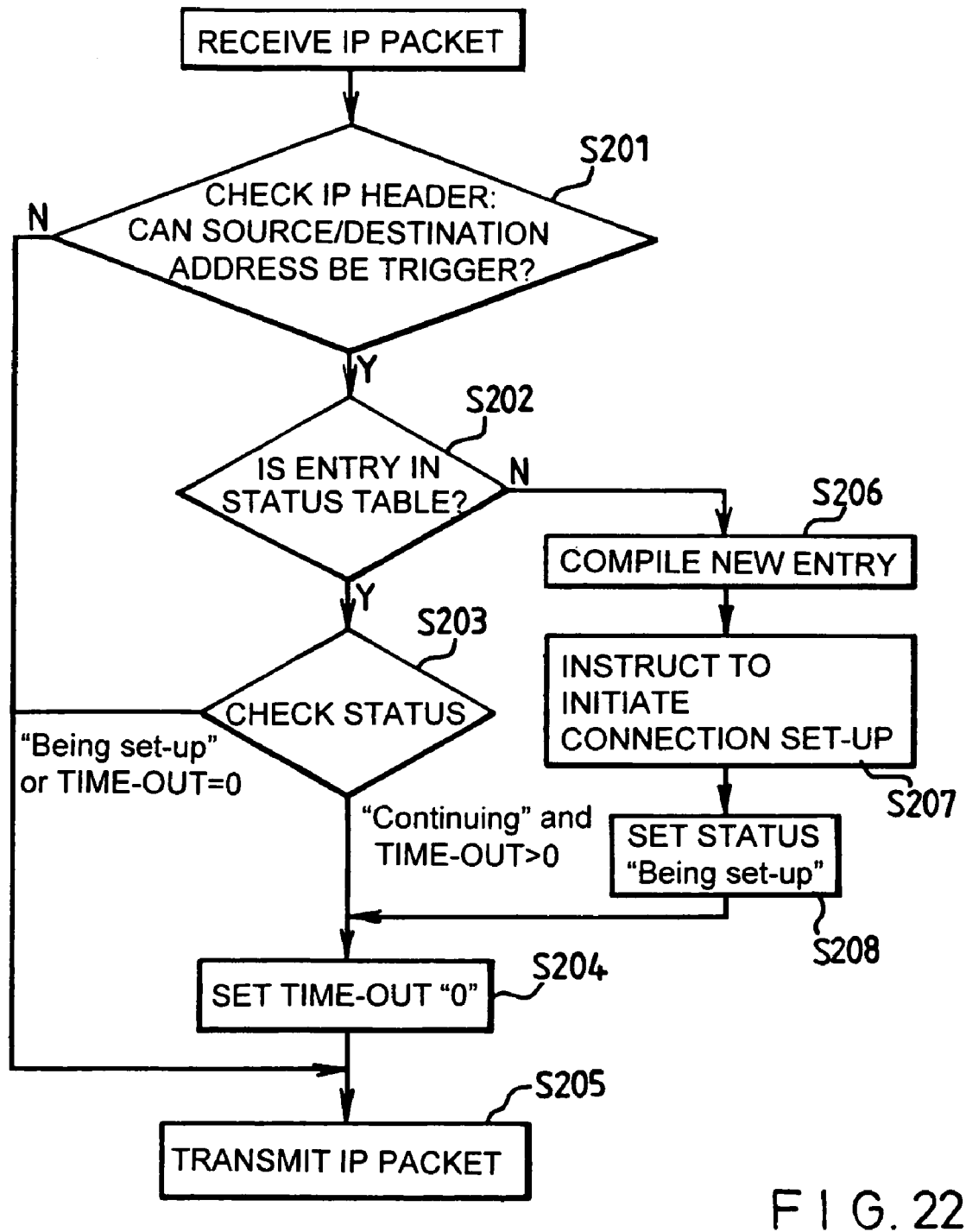
F I G. 22

NETWORK NODE APPARATUS AND CONNECTION SET-UP METHOD FOR SETTING UP CUT-THROUGH CONNECTION

This is a division of application Ser. No. 08/766,959, filed Dec. 16, 1996, now U.S. Pat. No. 6,614,795 which is incorporated herein by reference.

BACKGROUND OF THE INVENTION

1. Field of the Invention

The present invention relates to a network node apparatus such as a packet transmission node, a packet transfer node, and a packet reception node, and a connections set-up method suitable for internetworking.

2. Description of the Background Art

In recent years, as indicated by the Internet Draft (draft-ietf-ipatm-frameworkdoc-06.txt and draft-katsube-router-atm-overview-01.txt), the techniques described in 1) and 2) below have been proposed.

These techniques provide methods of implementing a cut-through connection in a large scale switched network.

A connection whereby packet transfer without network-layer processing can be effected inside a logical network (e.g. IP subnet) is called a datalink connection. A connection constituted by linking a plurality of datalink connections at the network layer for inter-network communication is called a "hop-by-hop" connection. In a hop-by-hop connection, the network layer processing is performed by routers located at subnet boundaries.

In contrast, in a "cut-through" connection, the network-layer processing is bypassed by some means, even if the hop-by-hop packet transfer would conventionally be necessary. In other words, in the cut-through connection, packet transfer from one logical network to another logical network can be performed solely by processing at a lower layer than the network layer.

1) Next Hop Resolution Protocol (hereinafter abbreviated to NHRP): when a packet transmission node which belongs to one logical network interrogates a server about a network address of a destination node which belongs to another logical network, the server returns the link address of the destination node or the nearest router to the destination node. Then, a datalink connection from the transmission node to the destination node or the router nearest the destination is established based on this link address. This datalink connection is a cut-through connection.

2) Cell switch router (hereinafter abbreviated to CSR): for specified traffic, packet transfer is performed using only information of the datalink layer, bypassing the network layer processing in an intermediate router. This is implemented as follows. The intermediate router stores the correspondence relationship between a datalink connection belonging to one logical network and another datalink connection belonging to another logical network for the specified packet flow, and transfers packets using this correspondence relationship. As a result, a cut-through connection is formed.

Such cut-through connections can achieve high throughput and low latency packet transfer for internetwork environment.

However, in NHRP, normally every packet to be transmitted is a trigger for setting up a cut-through connection. Specifically, when a node intends to transmit a packet to an address for the first time, a cut-through connection is set up by resolving the address; after that, all packets having the same destination network address are transferred through this cut-through connection. Consequently, a cut-through connection will be established even when the improvement in throughput achieved by the cut-through connection does not in fact outweigh the overhead involved in setting up the cut-through connection. Furthermore, it becomes difficult to utilize the bandwidth of the communication channel efficiently because the cut-through connections which are not in fact much used occupies the bandwidth.

In contrast, for the set-up of a cut-through connection under CSR, apart from using every packet transmission as the trigger, is possible to use as the trigger a) the fact that more than a fixed number of packets have been transmitted to a given destination or b) the fact that a TCP (transmission control protocol) message in which the flag SYN is set is to be transmitted. However, in the case of a), the fact that it is necessary to count the number of packets for all destinations makes the node structure complicated, and besides, a cut-through connection cannot be set up until the number of packets has reached a certain value. And in the case of b), a cut-through connection will be set up even for traffic in which only small amounts of data are exchanged a small number of times (i.e. for traffic in respect of which benefit matching the overhead involved in setting up the cut-through connection is not obtained, and established cut-through connections unnecessarily hogs the communication channel bandwidth).

SUMMARY OF THE INVENTION

It is therefore an object of the present invention to provide a system whereby the setting up of a cut-through connection can be restricted to traffic for which a certain level of communication (e.g. total data amount, number of packets, life length of packet flow, etc.) may be anticipated after the cut-through connection has been set up.

According to one aspect of the present invention there is provided a method for setting up a cut-through connection through which packets from a source node belonging to a logical network to a destination node belonging to another logical network are transferred, bypassing network-layer processing at at least one boundary between logical networks, comprising the steps of: receiving a packet from the source node to the destination node or a packet from the destination node to the source node; detecting the received packet to be a trigger according to at least one of source information and destination information of a layer higher than the network layer included in the received packet; and instructing, in response to the detecting step, a node capable of initiating a set-up operation to initiate the set-up operation to establish the cut-through connection.

This aspect of the present invention defines a method for initiating a set-up operation of a cut-through connection based on the source/destination information of a layer higher than the network layer (e.g. transports layer) of the packet. The packet, either from the source node to the destination node or from the destination node to the source node, detected to be a trigger suggests the likelihood that a relatively large number of packets to the destination node will be generated subsequently, because the likelihood depends on a protocol used at a layer higher than the transport layer in processing of the packet by the source/destination node.

According to another aspect of the present invention there is provided a method for setting up a cut-through connection through which packets from a source node belonging to a logical network to a destination node belonging to another logical network are transferred, bypassing network-layer processing at at least one boundary between logical networks, comprising the steps of: receiving a packet from the source node to the destination node or a packet from the destination node to the source node; detecting the received packet to be a trigger according to at least one of source information and destination information of the network layer included in the received packet; and instructing, in response to the detecting step, a node capable of initiating a set-up operation to initiate the set-up operation to establish the cut-through connection.

This aspect of the present invention defines a method for initiating a set-up operation of a cut-through connection based on the source/destination information of the network layer of the packet. The packet, either from the source node to the destination node or from the destination node to the source node, detected to be a trigger suggests the likelihood that a relatively large number of packets to the destination node will be generated subsequently, because under some network environments, it often happens that a specific node has a high likelihood of packet flow in comparatively large amounts.

According to another aspect of the present invention there is provided a network node apparatus, comprising; reception means for receiving a packet from a source node belonging to at least one logical network or an upper layer of the network node to a destination node belonging to another logical network; detection means for detecting the packet received by the reception means to be a trigger according to at least one of source information and destination information of a network layer and/or a layer higher than the network layer included in the packet received; set-up means for initiating, when the detection means detects the trigger, a set-up operation to establish a cut-through connection through which packets from the source node to the destination node are transferred, bypassing network-layer processing at at least one boundary between logical networks; and transmission means for transmitting packets destined to the destination node through the cut-through connection established according to the set-up operation initiated by the set-up means.

This aspect of the present invention defines a configuration of a network node which transmits packets and performs the trigger detection according to the present invention.

According to another aspect of the present invention there is provided a network node apparatus, comprising; reception means for receiving a packet from a destination node belonging to at least one logical network to a source node belonging to another logical network or an upper layer of the network node; detection means for detecting the packet received by the reception means to be a trigger according to at least one of source information and destination information of a network layer and/or a layer higher than the network layer included in the packet received; set-up means for initiating, when the detection means detects the trigger, a set-up operation to establish a cut-through connection through which packets from the source node to the destination node are transferred, bypassing network-layer processing at at least one boundary between logical networks; and transmission means for transmitting packets destined to the destination node through the cut-through connection established according to the set-up operation initiated by the set-up means.

This aspect of the present invention defines another configuration of a network node which transmits packets and performs the trigger detection according to the present invention.

According to another aspect of the present invention there is provided a network node apparatus, comprising; first reception means for receiving a packet from a destination node belonging to at least one logical network or an upper layer of the network node to a source node belonging to another logical network; detection means for detecting the packet received by the first reception means to be a trigger according to at least one of source information and destination information of a network layer and/or a layer higher than the network layer included in the packet received; instruction means for instructing, when the detection means detects the trigger, a node capable of initiating a set-up operation to initiate the set-up operation to establish a cut-through connection through which packets from the source node to the destination node are transferred, bypassing network-layer processing at at least one boundary between logical networks; and second reception means for receiving packets transferred through the cut-through connection.

This aspect of the present invention defines a configuration of a network node which receives packets from another node and performs the trigger detection according to the present invention.

According to another aspect of the present invention there is provided a network node apparatus, comprising; first reception means for receiving a packet from a source node belonging to at least one logical network to a destination node belonging to another logical network or an upper layer of the network node; detection means for detecting the packet received by the first reception means to be a trigger according to at least one of source information and destination information of a network layer and/or a layer higher than the network layer included in the packet received; instruction means for instructing, when the detection means detects the trigger, a node capable of initiating a set-up operation to initiate the set-up operation to establish a cut-through connection through which packets from the source node to the destination node are transferred, bypassing network-layer processing at at least one boundary between logical networks; and second reception means for receiving packets transferred through the cut-through connection.

This aspect of the present invention defines another configuration of a network node which receives packets from another node and performs the trigger detection according to the present invention.

Other features and advantage of the present invention will become apparent from the following description taken in conjunction with the accompanying drawings.

BRIEF DESCRIPTION OF THE DRAWINGS

FIG. 22 is a flow chart showing a procedure for initiating a set-up of a cut-through connection by the node of FIG. 21.

DETAILED DESCRIPTION OF THE PREFERRED EMBODIMENTS

General Description

Figures 1, 2:
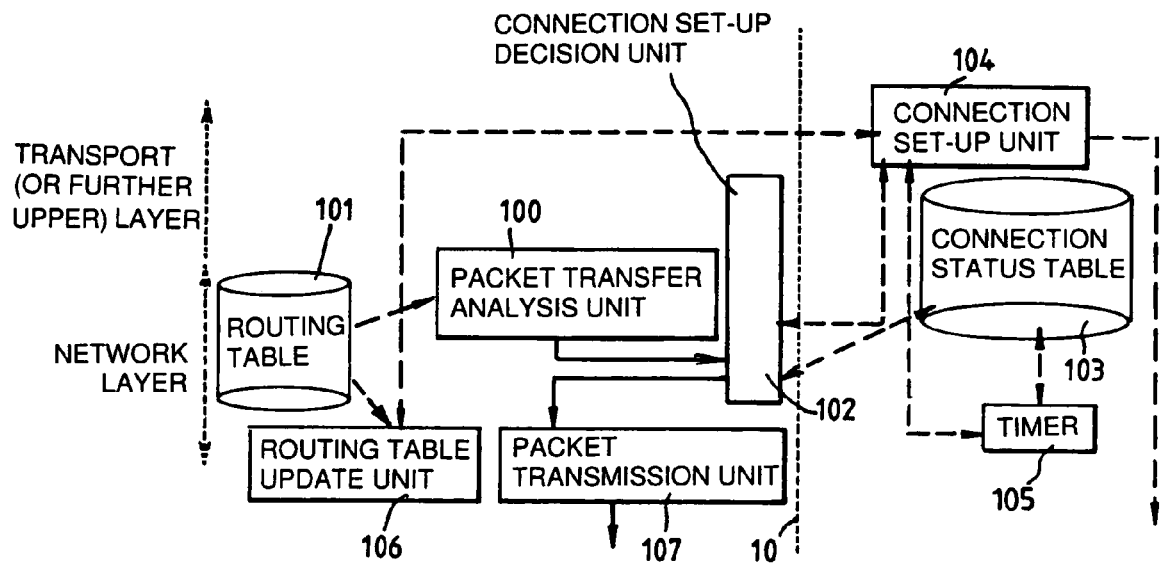
FIG. 1 is a schematic functional block diagram showing a configuration of one embodiment of a packet transmission node according to the present invention.
FIG. 2 is a diagrammatic illustration of a cut-through connection status table, which is used by the operations of the node.

A network node checks source/destination information of the transport layer and/or a source/destination information of the network layer of a received packet, and if the checked information satisfies a prescribed condition, determines the packet to be a trigger. Then, the network node instructs another node capable of initiating a set-up operation, which may be the network node itself, to initiate the set-up of the cut-through connection for traffic corresponding to the trigger packet. For example, packets whose source or destination port is FTP, HTTP, or NNTP may act as triggers.

Now, the preferred embodiment according to the present invention will be described in detail.

A network node that is capable of being the starting point or end point of a cut-through connection, before transmission of a packet or after receiving a packet, consults not only the information of the network layer of the packet but also at least one of the source information and the destination information of the transport layer.

The network node can be either a host or a router. Any network node located on the way from a source node to a destination node can also be the starting point or end point of a cut-through connection. The source and destination information of the transport layer is included in a transport-layer header.

Furthermore, if necessary, the node also consults information obtained from the transport-layer data (portion other than the header) in the packet.

If, as a result of these consultations, the node reaches the decision that it is worthwhile to establish a cut-through connection, the packet becomes a trigger for setting up a cut-through connection. Specifically, the node triggers initiation of the set-up operation of a cut-through connection, and transmits the packet.

On the other hand, if it decides that the set-up overhead is large so that it is not worth establishing a cut-through connection, the node transmits the packet ordinarily so that the packet reaches the destination node by hop-by-hop transfer.

There are various ways to set up a cut-through connection and to trigger initiation of the set-up operation. Here, CSR and NHRP for setting up a cut-through connection will be described in further detail for example. To simplify the description, it will be assumed that the network layer is IP (Internet Protocol) and the transport layer is TCP (Transmission Control Protocol) or UDP (User Datagram Protocol).

Also, when the terms "source" or "destination" are employed, unless otherwise indicated, they mean "source" or "destination" at the network layer. When the terms "address" are used, they indicate any one of "address of node", "network mask of node", and "flow ID".

In the case of CSR the following four modes will be described, depending on whether an output packet (packet to be transmitted) is employed as trigger or an input packet (received packet) is employed as trigger, or whether the node that detects the trigger (that decides whether or not to trigger initiation of the set-up action) is the source side node (node that may become the starting point of the cut-through connection) or the destination side node (node that may become the end point of the cut-through connection.

The case where the source side node initiates the set-up operation (i.e. transmits a set-up initiation message) will be described below, though there can be the case where the destination side node initiates the set-up operation. The set-up operation may be implemented by exchanging a plurality of messages, and also by transmitting a single message. In the former case, the set-up initiation message means the first (startup) message transmitted in the cut-through connection set-up sequence, and in the latter case, the set-up initiation message means that single message.

Figure 7:
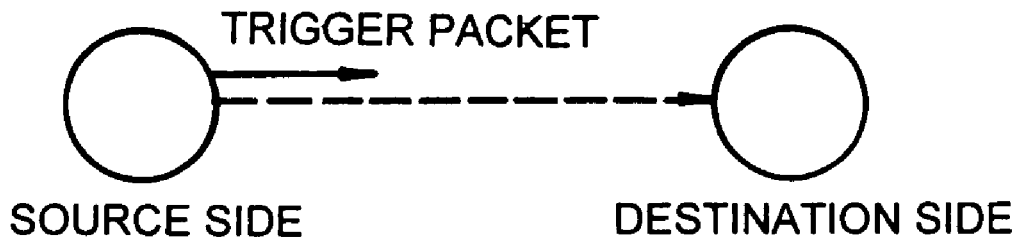
FIG. 7 is a diagram showing a relationship between a trigger packet and a detection node.

(I) Case where the detection node is the source side, the output packet being used as trigger (FIG. 7).

Figure 8:
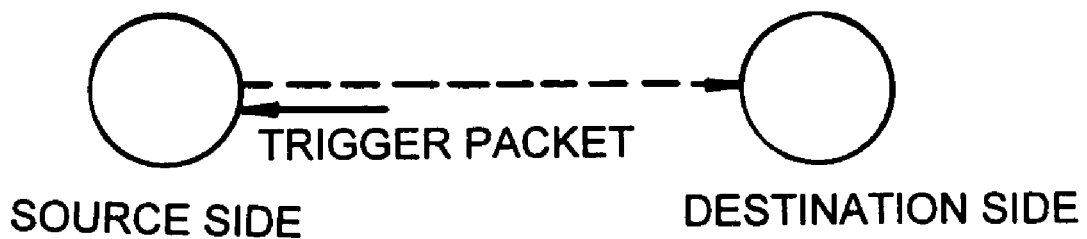
FIG. 8 is a diagram showing another relationship between a trigger packet and a detection node.

(II) Case where the detection node is the source side, the input packet being used as trigger (FIG. 8).

Figure 9:
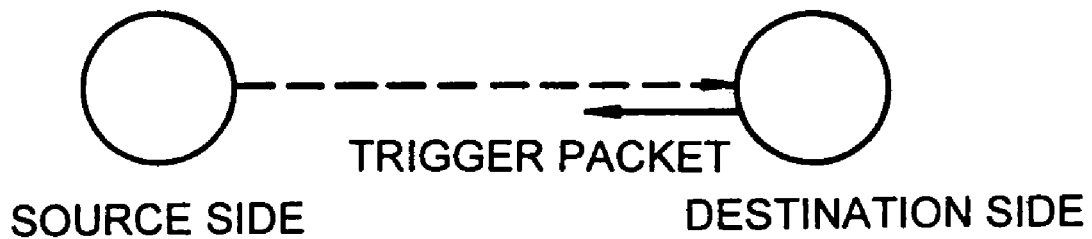
FIG. 9 is a diagram showing another relationship between a trigger packet and a detection node.

(III) Case where the detection node is the destination side, the output packet being used as trigger (FIG. 9).

Figure 10:
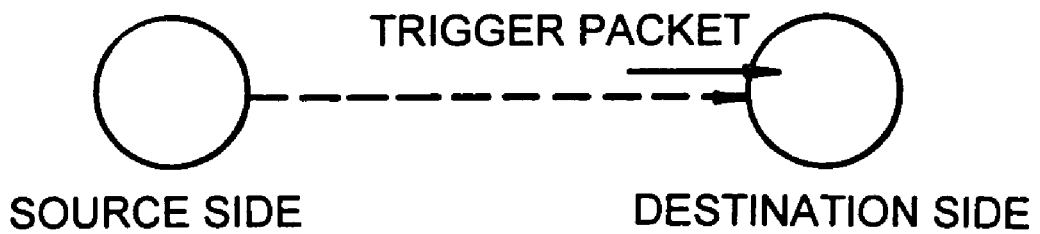
FIG. 10 is a diagram showing another relationship between a trigger packet and a detection node.

(IV) Case where the detection node is the destination side, the input packet being used as trigger (FIG. 10).

In FIG. 7 to FIG. 10, the direction of the packet constituting the trigger is indicated by the continuous-line arrow, and the direction of the cut-through connection which is attempted to be set up is indicated by the broken-line arrow. In addition, it is possible to combine a plurality of the above cases.

Here, an IP packet comprises an IP header, TCP/UDP header, and TCP/UDP data. The IP header includes source and destination information of the network layer, which represents respectively the source node's network address and the destination node's network address of the packet. This information is used at the network layer. The IP header also includes protocol information for identifying protocol used at the transport layer. The TCP/UDP header includes source and/or destination information of the layer higher than the network layer as source/destination port field, which represents protocol used at the layer higher than transport layer.

Case (I) for CSR

FIG. 1 illustrates a functional block diagram for performing the packet transfer according to CSR technology in the packet transmission node. The packet transmission node can be either one of a host or a router (packet transfer node). In FIG. 1, continuous lines indicate the flow of packets, and broken lines indicate the flow of control information.

When packet transfer analysis unit (100) receives an output packet from the node's own upper layer (packet whose protocol is of a layer higher than the network layer), or a transfer packet from another node, it finds a route from routing table (101) based on the destination IP address, and hands the packet over to connection set-up decision unit (102).

Connection set-up decision unit (102) examines the packet and cut-through connection status table (103) and, if necessary, issues a cut-through connection set-up instruction to connection set-up unit (104).

Connection status table (103) in the case of FIG. 1 is constituted as shown in FIG. 2. The destination IP address is the key when the status table (103) is examined. The status may be "continuing", "being set-up", or absence of an entry. "Continuing" means that a cut-through connection to the corresponding destination has been set up. "Being set-up" means that an instruction for set-up has been issued to connection set-up unit (104), but a connection has not yet been established. Absence of an entry means that there is no cut-through connection to the corresponding destination, nor has a set-up instruction been issued.

The field "time-out count" is periodically updated by timer (105), which will be described later. If this field of an entry whose status is "continuing" is 0, this means that at least one packet has been flowing on this cut-through connection for a certain period; if this field is one or more, this means that no packets have flowed on this cut-through connection during the period proportional to this number. This field of an entry whose status is "being set up" means that, even though a time indicated by the number (which may be 0) has elapsed, set-up has not been completed.

Figure 3:
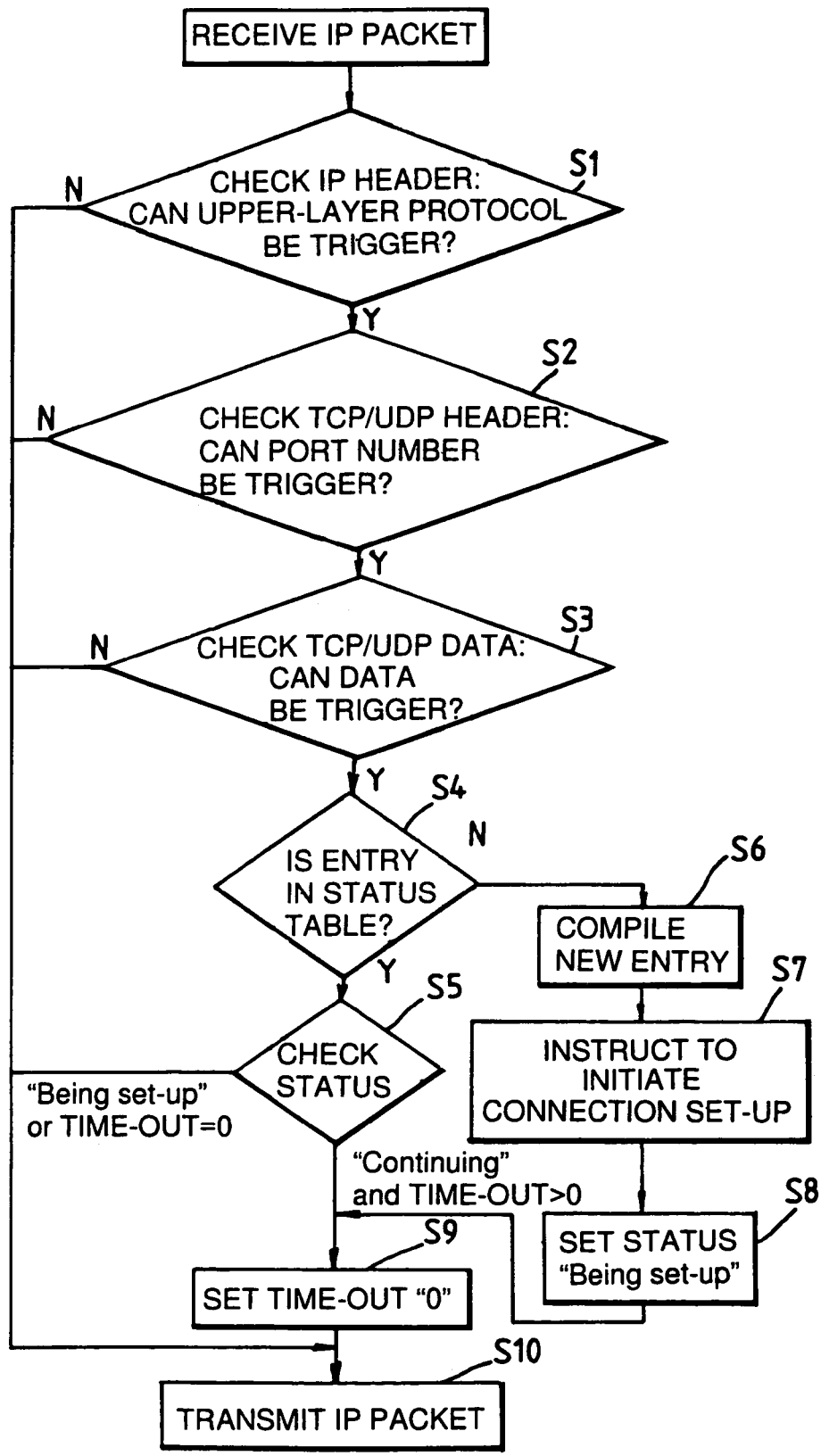
FIG. 3 is a flow chart showing a procedure for initiating a set-up of a cut-through connection by the node.

FIG. 3 shows a procedure for initiating cut-through connection set-up operation using the status table (103). The step S3 in the figure is optional. The step S1 in the figure is also optional, though it is recommendable in case identical port numbers indicate different protocols depending on the upper layer protocol (e.g. whether the upper layer protocol is TCP or UDP).

First of all, connection set-up decision unit (102) examines the upper-layer protocol field in the IP header of an IP packet that is input from packet transfer analysis unit (100) (S1). If the examining result (e.g. TCP or UDP is obtained as the result) is a protocol that can trigger a cut-through connection set-up according to the policy of the present system (S1 Yes), it checks at least one of the source and the destination port fields of the TCP/UDP header (S2). If the examined protocol is one that cannot trigger a cut-through connection set-up (S1 No), the packet is transmitted ordinarily through packet transmission unit (107).

If the result of checking the source or destination port field in the upper-layer protocol (TCP or UDP) header of the packet is that the packet is one that can trigger a cut-through connection set-up according to the policy of the present system (S2 Yes), if required by the system's policy, a further check is performed on the TCP/UDP data field (S3). If the checked packet is one that cannot trigger a cut-through connection set-up (S2 No), the packet is transmitted ordinarily through packet transmission unit (107).

As a result, if it is decided that the packet is suited for the cut-through transfer according to the system's policy (S2 Yes or S3 Yes), the cut-through connection status table (103) is examined (S4). If the decision is that the packet is not suited (S2 No or S3 No), the packet is transmitted ordinarily.

If, as a result of examining the condition table (103), it is found that there is no entry for the destination address of this packet, a new entry is compiled under the status "being set up" and the time-out count "0" (S6, S8, S9), and an instruction for set-up is issued to connection set-up unit (104) (S7).

On the other hand, if there is already an entry regarding the destination address of the packet, the status written in the table is checked (S5). If this is "continuing" and the time-out count is one or more, the time-out count is set to "0" (S9). If the status found by the check is "being set up", no action is taken.

After the above processing, the IP packet is output to packet transmission unit (107) (S10).

Timer (105) is actuated every time a fixed time has passed, in order to check whether or not the cut-through connection continues in use (for the connection whose status is "continuing"), or in order to check whether the set-up sequence is to be performed again (for the connection whose status is "being set-up"). Then, if required, the timer updates the status table (103).

Figure 4:
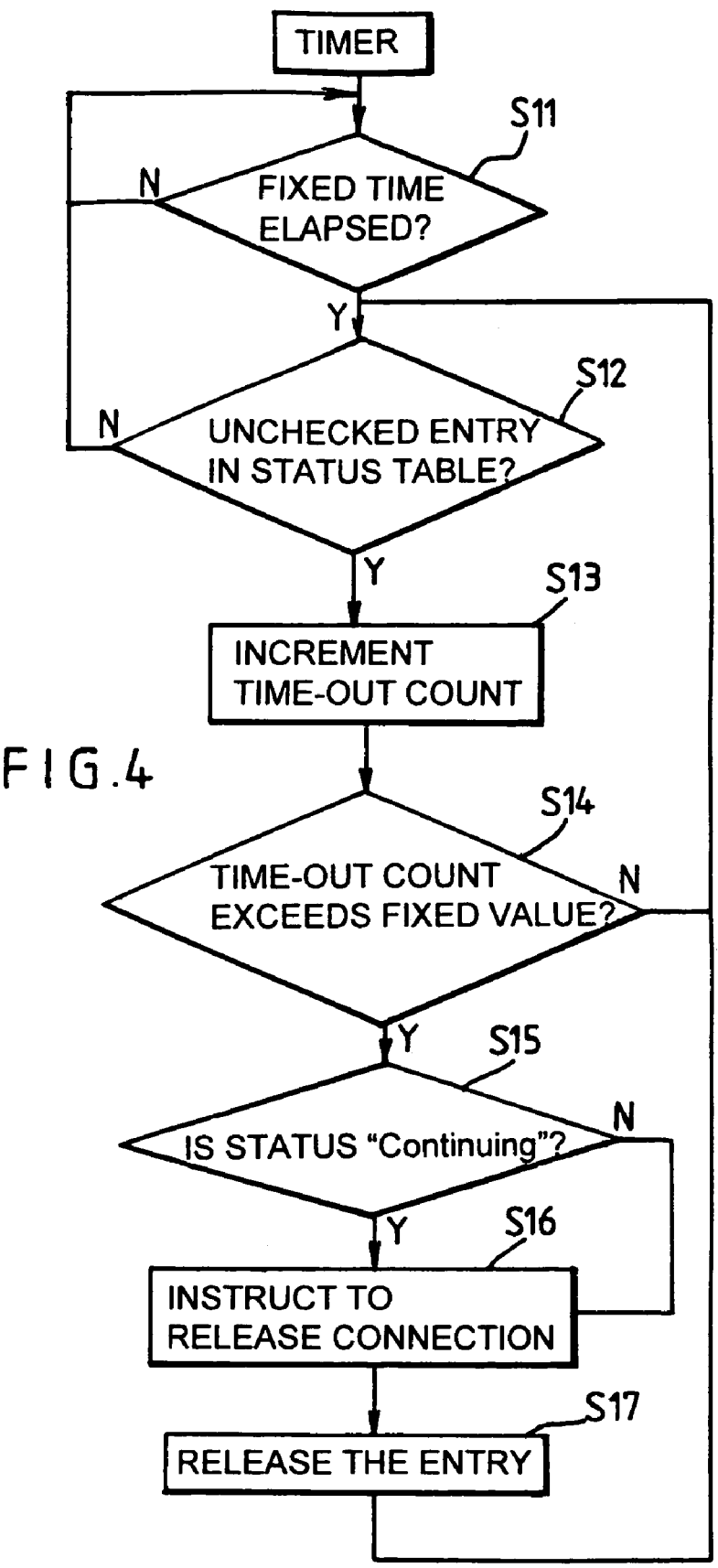
FIG. 4 is a flow chart showing a procedure of the timer.

The operation of the timer is shown in FIG. 4. First of all, for each entry of the status table (103), it increases the "time-out count" field by the prescribed number (S13). This prescribed number can be different for the cases where the status of the entry is "continuing" or "being set up", or can be the same in both these cases.

If the result exceeds a fixed value (S14 Yes), the entry in question is released (S17). This fixed value can be different for the cases where the status is "continuing" or "being set up", or can be the same in both cases. If an entry is released which was "continuing" (S15 Yes), an instruction is issued to connection set-up unit (104) to release the cut-through connection in respect of the corresponding destination address (S16).

Connection set-up unit (104) commences the cut-through connection set-up sequence on receiving an instruction issued at the step S7 from connection set-up decision unit (102). That is, it sends a connection set-up initiation message to the next hop router acting as CSR located on the route of the cut-through connection.

The above connection set-up initiation message, for example, may be a cut-through connection set-up request. In CSR, the cut-through connection is set up by registering the correspondence relationship between detalink connections at each router located on the route of the cut-through connection. One example of the set-up sequence for CSR is as follows. The node which initiates the set-up operation sends the cut-through connection set-up request that requests the above-mentioned registration of the correspondence relationship to a next hop router (CSR).

The router that has received this set-up request sets up a cut-through connection by registering this correspondence relationship between a first connection and a second connection. The first connection is from the node which sends the set-up request to the router, and the second connection is from the router to another next hop router (or the destination node). These connections will form parts of the cut-through connection.

If there remains another next hop router (CSR) on the way to the destination node, the router further transmits another set-up request to said another next hop router, and that router extends the cut-through connection by registering the correspondence relationship of the connections in the same way as described above. This extension is performed by repeating this process as far as the destination node or any router on the route to the destination node, and the cut-through connection terminates there.

Finally, the routers (CSRs) transfer packets sent from the source node after the cut-through connection is established, bypassing the network layer processing, using the stored correspondence relationships at the lower layer.

The above processing is performed where detalink connections constituting the respective parts of the cut-through connection have already been set up between the CSRs. In this case, for example, a Permanent Virtual Connection (PVC) or Virtual Path (VP) between the nodes has already been set up inside each logical network, or the communication channel between the CSRs is point-to-point physical link, and the PVC or a VC in the VP, or a VC in the physical link is used as part of the cut-through connection.

In contrast to this, it is possible to set up actively the necessary datalink connections for constituting a cut-through connection by employing Switched Virtual Connection (SVC). In this case, when connection set-up unit (102) receives an instruction from set-up decision unit (104), it first of all sets up a datalink connection to the next hop router (CSR) with signaling. After this set-up has been successfully completed, the connection set-up unit (102) sends a connection set-up request (set-up initiation message) to the next hop CSR.

The next hop CSR that has received the connection set-up request sets up an SVC to its next hop router in the same way as above, and stores the correspondence relationship of the input/output connections (SVCs) in the same way as already described in the PVC/VP case. Next, the next hop CSR sends another connection set-up request to its next hop router. When repeating this process until the destination node is reached, a cut-through connection is established from the source node to the destination node.

Another example of the set-up initiation message is a message including information for registration of the above correspondence relationship (not compelling the next hop router to register). The router that has received this message can recognize the traffic (packet flow) for which set-up of a cut-through connection is desirable and the datalink connection which may become a part of the cut-through connection, thus the router can exchange information with its next hop node and can register the correspondence relationship depending on its own decision.

In the case where PVC or SVC is used as a datalink connection, the set-up initiation message may be a message including information for recognition of the datalink connection at the next hop router.

It should be noted that it is not necessary that the above processing should be carried on at the source node of the packet which acts as the trigger. For example, in the following cases, this processing is performed by a router located on the route from the source node to the destination node, and the router possibly becomes the starting point of the cut-through connection.

Case where the source node does not have an ATM interface

Case where the source node is not in accordance with CSR protocol

Case where, for some reason such as insufficiency of bandwidth, it is not possible to set up a datalink connection to be used as part of a cut-through connection from the source node to the next hop router.

In these cases, hop-by-hop transfer is performed from the source node to the router in question and cut-through transfer will be performed from the router in question. However, one or more further cut-through connections could be provided in the section from the source node up to the router in question (packets from the source node to the destination node could be transferred through one cut-through connection until they reach somewhere on the way to the destination, then transferred through hop-by-hop connection, and after they reach the router in question, transferred through another cut-through connection).

Likewise, it is not essential for the end point of the cut-through connection which is set up as a result to be the destination node of the packet that triggered the set-up of the cut-through connection. For example, in the following cases, a router located on the route from the source node to the destination node possibly becomes the end point of the cut-through connection.

Case where the destination node does not have an ATM interface

Case where the destination node is not in accordance with CSR protocol

Case where, for some reason such as insufficiency of bandwidth, it is not possible to set up a datalink connection to be used as part of a cut-through connection from an upstream node to the destination node.

In these cases, hop-by-hop transfer is performed from the end point of the cut-through connection to the destination node. However, there can be one or more further cut-through connections between the end point node and the destination node.

It should be noted that the above argument is applicable not only to the case where the cut-through connection set-up sequence is end-to-end but also to the case where the set-up sequence is link-by-link. In the end-to-end sequence, the router that has received the cut-through connection set-up request always transmits another set-up request unless it is not the end point to its next hop node. In the link-by-link sequence, the router that has received the message possibly being used in set-up of the cut-through connection decides locally whether or not to transmit another message to its next hop node based on the data packet that it has received by itself.

When a cut-through connection is established, the set-up unit (104) updates the routing table (101) through routing table update unit (106), and updates the status of the corresponding entry of the connection status table (103) through a connection set-up decision unit (104) to "continuing" and "time-out 0".

Subsequent packets to this destination node are transmitted through the cut-through connection by referring to the updated routing table (101), so they are transferred at higher rate without being subjected to IP processing at an intermediate router.

It should be noted that the alteration of the aforementioned routing table (101) does not need to wait to be notified of establishment of a cut-through connection to the end point, but could be performed after the part of connection set-up sequence that the transmission node should execute has been finished, or after notification to the effect that the neighboring router has finished registration of the correspondence relationship has been received from that neighboring router. If the connection employed for transmission of packets to the destination node prior to set-up of the cut-through connection is taken as a connection forming a part of the cut-through connection, updating of the routing table (101) need not be performed.

In addition, on receiving an instruction issued at the step S16 from timer (105), the set-up unit (104) performs release of the cut-through connection. This may be performed either by the hard-state method of sending a release message to the next hop router (CSR), or the soft-state method of not sending a refresh message for maintaining the cut-through connection to the next hop router (CSR). As a result, when the packet suited for the cut-through transfer according to the system's policy is not transmitted for a predetermined period, the cut-through connection is released. The set-up unit (104), if necessary, updates the routing table (101) to change over the transmission connection for subsequent packets to an ordinary one. By this means, waste of connection resources can be prevented by releasing unused connections.

Packet transmission unit (107) hands over to the interface layer packets that have passed through connection set-up decision unit (102).

It should be noted that, although, in the example described above, the packet itself that constituted the trigger instructing transmission of a connection set-up initiation message was sent by an ordinary connection by S10 of FIG. 3 (this means that the first few packets in a new packet flow are transferred by hop-by-hop connection and that the subsequent packets in the packet flow transmitted after the routing table has been updated are transferred by cut-through connection), it would be possible for this trigger packet and packets subsequent to this for the same destination node to be stored in the buffer and to be transmitted by the cut-through connection after the cut-through connection has been established.

The locations of the various functional blocks to the left of the dotted line 10 in FIG. 1 indicate by their positional relationship whether their processing is performed at network layer or at transport (or further upper) layer.

Packet to be a Trigger

Figure 5:
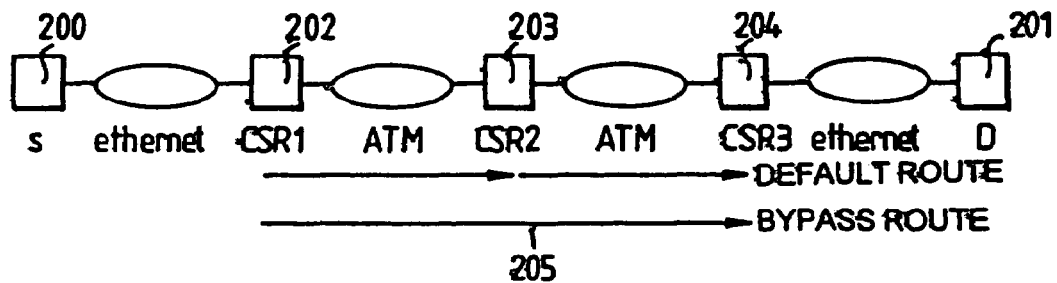
FIG. 5 is a diagram of a network configuration example including CSR.

First of all, an example where the FTP (file transfer protocol) is taken as trigger will be described. FIG. 5 is a diagram of an example of network configuration according to CSR.

In FIG. 5, S (200) and D (201) are hosts, and CSR1 (202), CSR2 (203) and CSR3 (204) are routers acting as CSRs. CSR1 and CSR3 connect an ethernet and an ATM (asynchronous transfer mode) network which are logical networks, and CSR2 connects ATM networks (logical networks).

We shall now consider the case where a cut-through connection is set up from CSR1 (202) to CSR3 (203), triggered by an FTP data packet in the traffic from S to D. Hereinafter, to simplify the description, it will be assumed that the traffic from the server to the client is the subject of a cut-through connection. That is, S in FIG. 5 is an FTP server, and D is the client.

In the present case, a service such as for example "get" of the FTP is provided by means of the cut-through connection. The opposite process may also be considered, in which a service such as "put" of the FTP is provided by using a cut-through connection for traffic from the client to the server. In this opposite case, S is the FTP client and D is the FTP server.

The FTP data traffic normally employs a reserved (well-known) port in the server, thus, in S2 of FIG. 3, connection set-up decision unit (102) checks the port field which corresponds to the server (i.e. the source port field in the present case, the destination port field in the opposite case) of the upper protocol (TCP) header.

In the FTP, a control session and a data session are provided separately, thus it is also possible to use a control-session packet as trigger. Furthermore, it is also possible to include in the aforementioned decision process a decision as to whether the packet is the initial packet of the session or not (i.e. whether the SYN flag is set or not in the packet). Consequently, the following four alternatives for triggering represent the possible combinations of the above, in the present case.

(1) An arbitrary packet the source port of which indicates FTP control;
(2) A packet whose SYN flag is set and the source port of which indicates FTP control;
(3) An arbitrary packet the source node of which indicates FTP data;
(4) A packet whose SYN flag is set and the source port of which indicates FTP data.

Normally, the packets output from S (200) are respectively subjected to IP processing at CSR1 (202), CSR2 (203), and CSR3 (204), and are transferred in this order (default route). However, when S(200) sends a packet which can trigger the set-up of a cut-through connection regarding FTP data (any one of the above (1)-(4) or a combination thereof) to D (201), connection set-up decision unit (102) of CSR1 (202) recognizes this packet in step S2 of FIG. 3, and, by means of the set-up operation described above, sets up a cut-through connection (bypass route (205)) from CSR1 (202) to CSR3 (204). Then, subsequent packets from S (200) to D (201) pass through bypass route (205), so they are not subjected to IP processing by CSR2 (203).

It is possible not only for the router but also for a host (S) so long as it can cope with CSR protocol to set up the bypass route, because the set-up process described above can be applied to packets generated at the upper layer.

Figure 6:
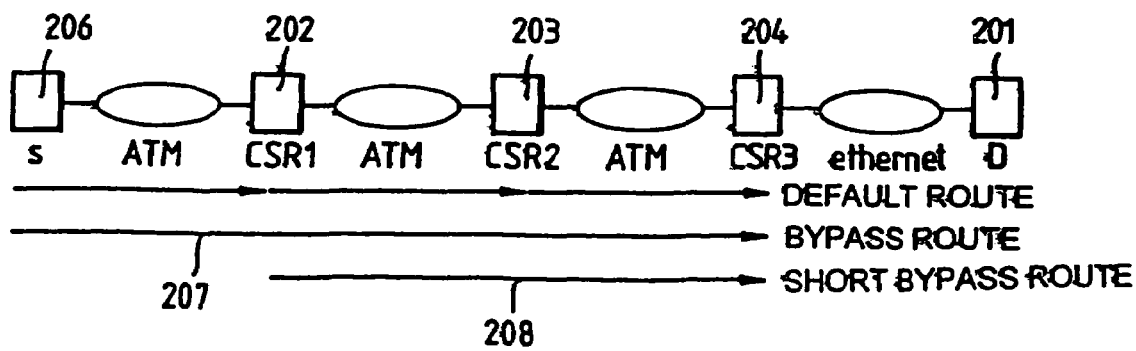
FIG. 6 is a diagram of another network configuration example including CSR.

Let us now consider a network configuration as shown in FIG. 6. In this figure, the link between S (206) and CSR1 (202) is ATM and S (206) can cope with CSR protocol. In this case, when S (206) outputs a packet that triggers the set-up of a cut-through connection regarding FTP data to D (201) and sets up a cut-through connection (bypass route (207)) from S(206) to CSR3 (204). Furthermore, so long as the destination host (D) is capable of dealing with CSR protocol, a bypass route can be set up directly to the destination host rather than to the router.

Conversely, for reasons such as insufficiency of bandwidth etc., it is possible that a cut-through connection may be formed that is shorter than the cut-through connection that ought to have been set up. For example, in FIG. 6, if an SVC could not be set up from S (206) to CSR1 (202), a bypass route (208) from CSR1 (202) to CSR3 (204) is set up instead of bypass route (207) that ought to have been set up.

Next, the case where another TCP session acts as trigger will be described. Apart from FTP, HTTP (hypertext transfer protocol) and NNTP (network news transfer protocol) etc. are examples in which a comparatively large number of packets are transferred. In these cases also, if it is assumed to use the data from server to client as trigger, there are the following two types of triggers, depending on whether the first packet of the session is distinguished or not.

(1) An arbitrary packet whose source port is HTTP (or NNTP);
(2) A packet whose source port is HTTP (or NNTP) and whose SYN flag is set.

In this case also, in S2 of FIG. 3, connection set-up decision unit (102) of a router on the route or the transmission host checks the source port field of the upper protocol (TCP) header in the packet and, furthermore, if necessary, checks whether the SYN flag has been set. If the packet is decided to act as trigger, a cut-through connection is set up just as in the case of FTP.

Next, the case where an NFS (Network File System) acts as trigger will be described. In the above examples, a TCP packet was chosen as trigger; however, this is the result of selection as a "service for which continuous (long-life) traffic may be expected", and was not because of the special characteristics of TCP itself. We shall now consider NFS as an example wherein the same benefits can be expected as in services using UDP.

Under RFC1094, in the current version, the NFS server is set up to employ a fixed port number. The packets intended for NFS can therefore be identified by the UDP source or destination port number.

Further, in this case, an example in which the transport-layer data field is also used as trigger will be described. Here, not just the port number but also the NFS procedure are identified, and a packet of NFS "READ" from server to client and a packet of NFS "WRITE" from client to server are solely taken as trigger.

The processing sequence in this case may for example be as follows. First of all, the protocol field of the IP header is checked (S1 in FIG. 3). If this protocol field is UDP, the source and destination port number of the UDP header are checked (S2 in FIG. 3). If, as a result, it is found that either one of these is the aforesaid fixed number, in addition, the data field is checked (S3 in FIG. 3). Specifically, if it is verified that the packet is for NFS by referring to an RPC program number in the data field, the procedure number in the data field is checked. If, as a result, it is found that the procedure number indicates READ from the server or WRITE to the server, an instruction is issued to connection set-up unit (104) (S7 in FIG. 3).

The individual examples described above are not mutually exclusive. Triggering may therefore be performed using a combination of some or all of the examples given up to this point. For example, it is possible to arrange to set up a cut-through connection when an FTP data packet or an HTTP packet is to be transmitted. In this case too, the procedure of FIG. 3 can basically be employed except that a plurality of conditions are examined in S1 to S3.

Also, which of the triggers for establishing a cut-through connection exemplified above should be employed may be selected based on experience. This includes the case where the user of the connection sets the trigger manually each time. In contrast, trigger selection may be performed in accordance with some kind of quantitative statistical information. An example of the quantitative statistical information method is as follows.

In cases where the number of cut-through connections that may be established at one time is restricted, it is necessary to release cut-through connections that are not being used at suitable times. Let us therefore assume that cut-through connections are released through which no data has been transferred for a period of ti seconds. We now assume that packets will have been transmitted with frequency more than $1/ti$ (packets/second) toward the end point of the cut-through connection, after detection of a packet treated as a trigger, for an average period of T seconds, and that the time required for release of the cut-through connection established to the end point is tr seconds. Then, the use rate of this cut-through connection can be defined by $T/(T+ti+tr)$.

If now we assume that, from the point of view of the capacity of the network as a whole, it is beneficial to set up a cut-through connection if the rate of use at a packet transmission node is R or more, packets satisfying $T/(T+ti+tr)>=R$ may be taken as trigger.

T can be determined statistically by monitoring the packets transmitted from the node in question for each case where the trigger is fixed respectively to a provisional kind of packet, in other words, where a packet that triggers initiation of cut-through connection set-up is tentatively the one whose transport-layer source/destination information (and, if required, whose transport-layer data information) indicates respectively predetermined protocol or so. It is enough for this monitoring to be performed for a fixed period prior to selection of a trigger.

Then, if the determined T satisfies the condition: $T/(T+ti+tr)>=R$, a packet possessing the same information as the above tentative information will be taken as the trigger for initiation of cut-through set-up operation.

Case (II) for CSR

Figure 11:
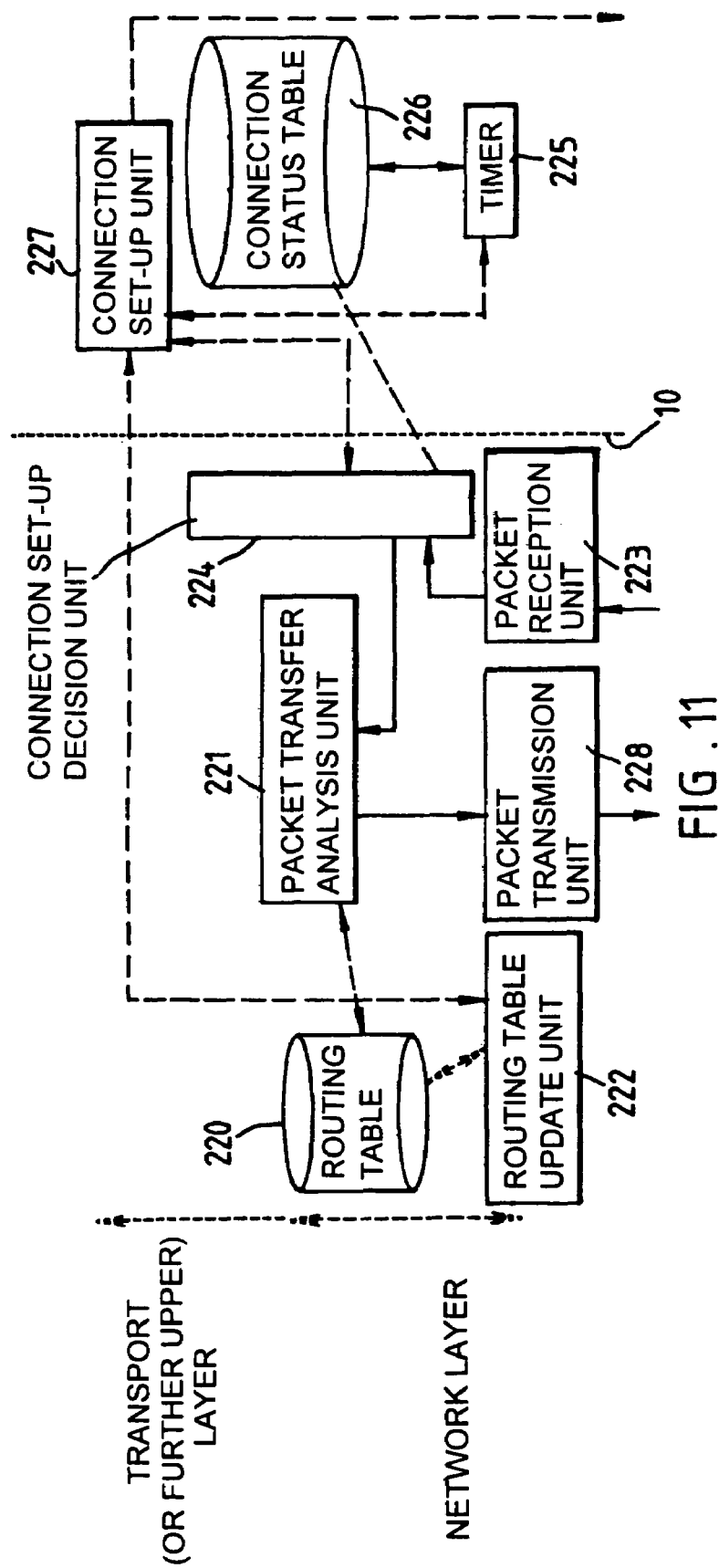
FIG. 11 is a schematic functional block diagram showing a configuration of another embodiment of a packet transmission node according to the present invention.

FIG. 11 illustrates a functional block diagram for performing the packet transfer according to CSR technology in the packet transmission node, and is the same as FIG. 1, except for packet reception unit (223), connection set-up decision unit (224) and packet transfer analysis unit (221).

Packet reception unit (223) hands over an input packet to the connection setup decision unit (224). The processing procedure at the connection set-up decision unit (224) is identical with that of decision unit (102) of FIG. 1 except for the fact that the direction of the packet constituting the trigger and the direction of the cut-through connection to be established are opposite, i.e. the cut-through connection is set up toward the source of the packet that triggered it. This decision unit (224), after processing up to S9 of FIG. 3 has been completed, hands over the packet to the packet transfer analysis unit (221).

Packet transfer analysis unit (221) receives output packets from the node's own upper layer and packets handed over to it from connection set-up decision unit (224). Of those packets which are handed over to it from the decision unit (224), any that are destined for the node itself it hands over to the upper layer. For packets that are to be transferred (including output packets from the upper layer), a route is found from routing table (101) based on their destination IP addresses, and these are then output to a suitable interface through packet transmission unit (228).

If connection set-up decision unit (224) decides that an input packet constitutes a trigger, a cut-through connection is set up in the opposite direction to the input packet and any subsequent packets addressed to this destination (i.e. the source of the input packet) are transferred by the cut-through connection.

This case will be described below with reference to FIG. 5, assuming that the network configuration, the bypass route to be established and the kind of packets to be treated as the triggers are the same. CSR1 (202) detects a trigger, and then sends a set-up initiation message in the direction opposite to that of the packet constituting the trigger. A bypass route (205) is thereby set up.

As in the case (I), for example, application to the case of FTP will be considered. It will now be assumed that S (200) is an FTP server, D (201) is an FTP client, and that S (200) transmits packets including FTP data to D (201) on bypass route (205). In this case, it is preferable that the trigger for the cut-through connection set-up is a packet of the FTP control session from client D (201) to server S (200), because under FTP, session from client to server exists before data transfer from server to client. According to this method, it may be anticipated that more FTP data packets will flow on the bypass route due to the bypass route being set up before data transfer.

In FIG. 5, first of all, client D (201) establishes an FTP control session to server S (200). In this process, a packet whose destination (S) TCP port is FTP control passes through CSR1 (202). When CSR1 (202) detects this packet, it commences set-up of a bypass route (205) toward D (201). After this bypass route (205) has been set up, packets including FTP data packets from S (200) to D (201) pass through the bypass route.

It should be noted that many of the alternative ways shown in the case (I) are also applicable to this case (II).

Case (III) for CSR

Figure 12:
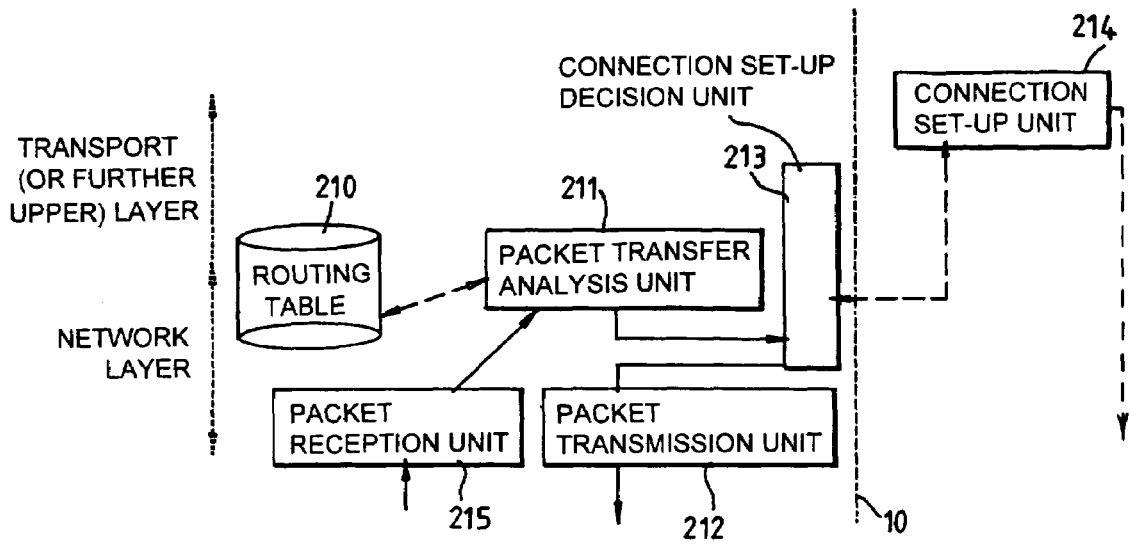
FIG. 12 is a schematic functional block diagram showing a configuration of another embodiment of a packet reception node according to the present invention.

FIG. 12 illustrates a functional block diagram of the CSR-capable packet reception node. The packet reception node can be either one of a host or a router (packet transfer node). Routing table (210), packet transfer analysis unit (211), and packet transmission unit (212) are the same as in FIG. 1.

Connection set-up decision unit (213) is practically the same as decision unit (102) in FIG. 1, but, in this case, a check of connection status is not carried out. Consequently, in FIG. 12, the connection status table (103) and timer (105) in FIG. 1 are absent. However, in the case where the content of connection status table (103) provided by the transmission node is notified as occasion arises to this reception mode, a status table is provided and a connection status check would be performed.

When it receives an instruction from the decision unit (213), connection set-up unit (214) issues a request toward the packet transmission node, which is the destination node of the trigger packet, for initiating the set-up operation of a cut-through connection. The request will be caught by any node located on the route of the cut-through connection that is required to be set up, and the node that catches the request commences set-up of the cut-through connection with a set-up initiation message. It means that this request is different from the set-up initiation message itself (e.g. the set-up request to the next hop router in the end-to-end sequence).

This request is transferred by a hop-by-hop connection toward the transmission node, and, for example, the cut-through connection is set up by the transmission node that has received this request (e.g. source host or initial-stage CSR) and, in response to the request, sends a connection set-up initiation message. Hereinafter, this request may be called a connection request message.

The set-up unit (214) does not check whether a connection has actually been set up. However, when connection set-up decision unit (224) has decided that an output packet constitutes a trigger, a cut-through connection is set up in the opposite direction to the output packet as described above, and a packet from the transmission node becomes transferred through the cut-through connection, and this packet is received by packet reception unit (215).

This case also will be described below with reference to FIG. 5, where a bypass route (205) for traffic from FTP server (200) to client (201) is established. An FTP data packet from client (201) to server (200) is used as trigger.

When CSR3 (204) detects an FTP data packet for server (200), it sends a connection request message in the direction of server (200). When first-stage CSR1 (202) receives this request message, it sends a set-up initiation message in the direction of client (201) to set up a bypass route (205).

In this case (III) and subsequent case (IV), the node that detects the trigger for a cut-through connection is not the node that initiates the set-up of the cut-through connection. In these instances also, just as in the cases (I) and (II), which trigger the establishment of a cut-through connection may be selected by experience, or may be selected on the basis of some kind of quantitative statistical information.

The quantitative statistical information method will now be described, focusing on the feature of cases (III) and (IV) that, mainly, the trigger is detected by a node other than the node that commences the cut-through connection set-up).

As described, it is assumed to release cut-through connections over which there has been no flow of packets for a period $t_i$, in order to search the necessary conditions. If now packets from the transmission node will have been received with frequency more than $1/t_i$ (packets/second), after detection of a packet treated as a trigger, for an average period T, the rate of use of this cut-through connection may be defined as $T/(T+t_i)$.

However, since, in this example, the starting point of the cut-through connection cannot be determined by the node that detects the trigger, the time required to release the cut-through connection is assumed to be sufficiently small to be neglected. Also, since the fact that packets whose source is other than the destination address of the trigger packet in case (III)/the source address of the trigger packet in case (IV) may also transferred through this cut-through connection cannot be recognized by the reception node, the use rate defined may be lower than the actual use rate.

If it is assumed that, from the point of view of the capacity of the network as a whole, it is beneficial to set up a cut-through connection when this rate of use is R or more, it is suitable to take a packet satisfying $T/(T+t_i)>=R$ as trigger.

T can be determined statistically as already described, and the kind of packet that should be taken as the trigger can be selected depending on whether the determined T satisfies the condition $T/(T+t_i)>=R$.

Case (IV) for CSR

Figure 13:
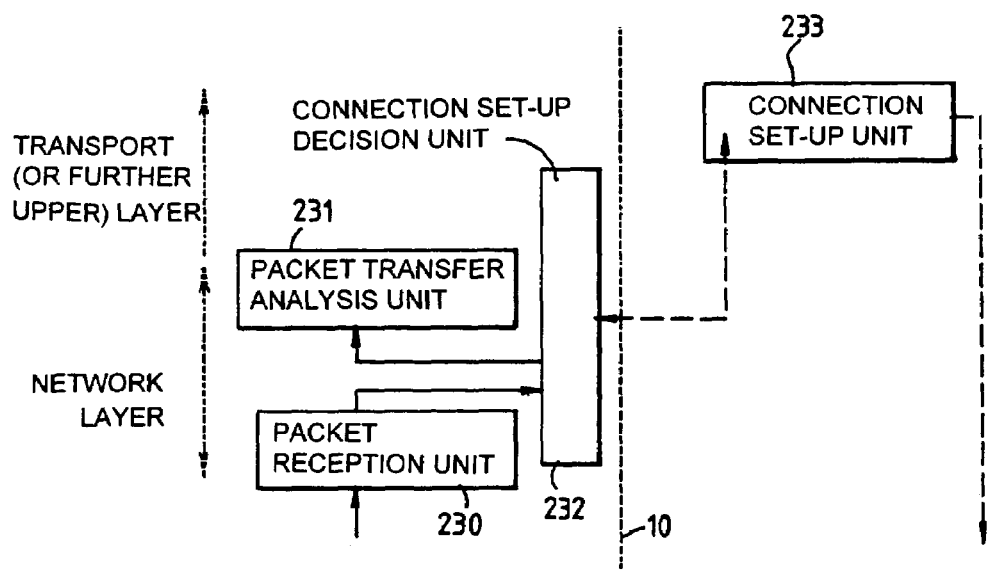
FIG. 13 is a schematic functional block diagram showing a configuration of another embodiment of a packet reception node according to the present invention.

FIG. 13 illustrates a functional block diagram of the CSR-capable packet reception node. The packet reception node can be either one of a host or router (packet transfer node). In FIG. 13, packet reception unit (230) and packet transfer analysis unit (231) are respectively identical with reception unit (223) and analysis unit (221) of FIG. 11. Connection set-up unit (233) is identical with that of FIG. 12 (214).

Connection set-up decision unit (232) is identical with decision unit (213) of FIG. 12 except for the fact that it receives packets from receiving unit (230) and hands them over to transfer analysis unit (231).

As in the case of FIG. 12, a connection status table and timer are not provided. Also, set-up unit (233) sends a connection request message toward the transmission node (in this case the source node of the trigger packet) instead of a set-up initiation message. Furthermore, set-up unit (233) does not check whether a connection has actually been set up or not.

When connection set-up decision unit (232) decides that an input packet is to be a trigger, a cut-through connection in the same direction as the input packet to the reception node is set up, so that packets from the transmission node that transmits the connection set-up initiation message are transferred through the cut-through connection, and these packets then are received by packet reception unit (230).

This case also will be described with reference to FIG. 5. An FTP data packet from server (200) to client (201) is used as the trigger. The trigger is detected by CSR3 (204). When CSR3 (204) detects an FTP data-packet to the client, it transmits a connection request message in the direction of server (200). When this request message is received by first-stage CSR1 (202), CSR1 transmits a set-up initiation message in the direction of client (201), so that a bypass route (205) is set up.

In this case also, just as in case (III), the selection of a trigger can be performed using statistical information. In case (IV), the source and destination addresses of the monitored packet are respectively the same as these of the trigger packet, though further details of the procedure and the mathematical expression employed may be the same as for case (III).

The above description is on the assumption that the node that initiates the setup of a cut-through connection is the source-side (upstream) node, i.e. the established cut-through connection is downstream of the node that initiates the set-up. However, it is also possible for a node to establish the cut-through connection upstream of itself. In this case, a reception (destination-side) node that, detects a trigger need not send a connection request message toward the source node for asking to transmit a set-up initiation message in the opposite direction. Instead, the reception node that detects a trigger can send the set-up initiation message to the upstream node by itself.

More specifically, if the upstream node (router) that has received the set-up initiation message from the reception node sends the set-up initiation message to a further source-side node (the upstream node also operates like the reception node) and registers the correspondence relationship between a first connection from the further source-side node and a second connection to the reception node, a cut-through connection is established from the further source-side node to the reception node according to the trigger.

Furthermore, many of the alternative ways described in the cases (I)-(III) are also applicable to this case (IV).

The advantage of the above case (III) and (IV) is that the trigger detection can be performed by a destination-side node even if a source-side node, in other words a node capable of initiating the set-up of cut-through connections, has no function for detecting the trigger.

Combination of Case (I) to (IV) and Modification

Figure 14:
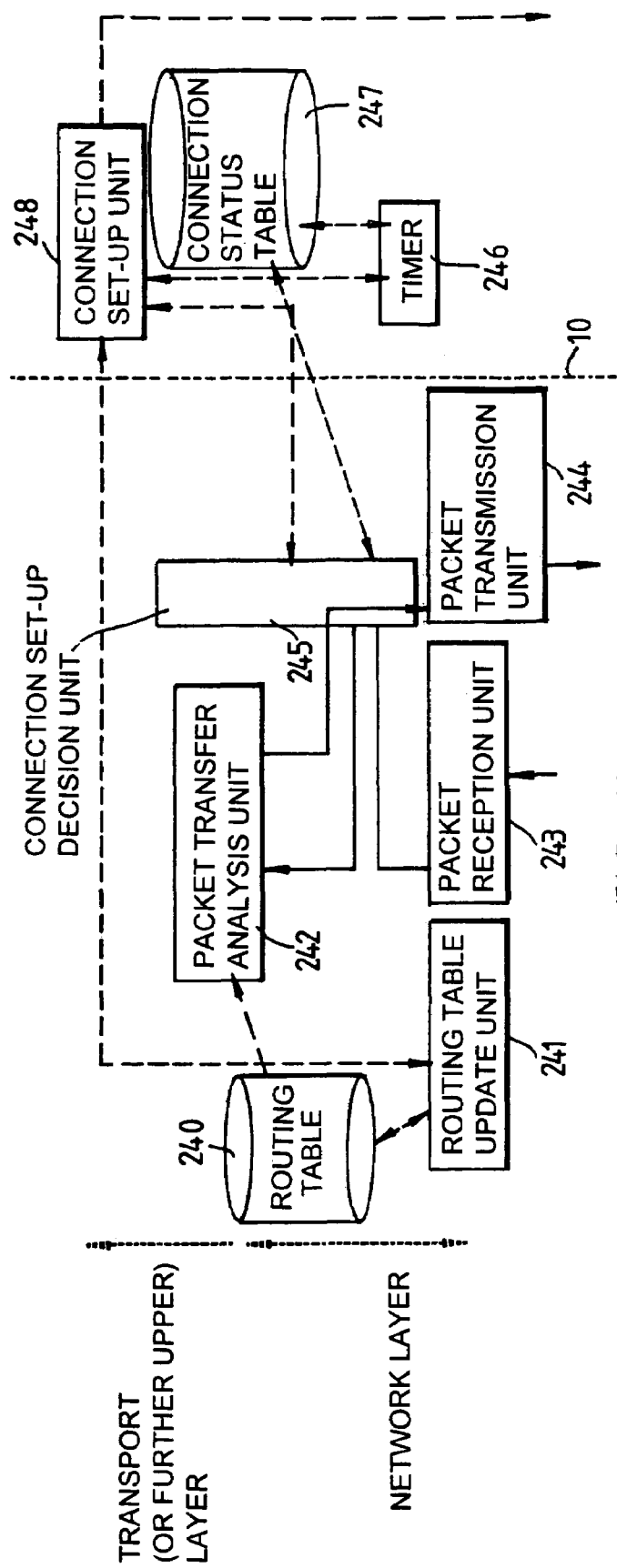
FIG. 14 is a schematic functional block diagram showing a configuration of another embodiment of a packet transfer node according to the present invention.

A node of an even more complicated structure can be implemented by combining the four cases described above. As an example, FIG. 14 shows a node layout including all four of FIGS. 7 to 10.

The operation of the node shown in this Figure is essentially a combination of those already described. In more detail, packets received by packet reception unit (243) are first of all handed over to connection set-up decision unit (245).

The processing performed by decision unit (245) will be described later. Packets that have been subjected to this processing are next transferred to packet transfer analysis unit (242).

Analysis unit (242) receives output packets from the node's own upper layer and packet handed over from the connection set-up decision unit (245). The analysis unit hands over to the upper layer any packets which are addressed to itself, of the packets handed over to it from the decision unit (245). For packets which are to be transferred (including output packets from the upper layer), it finds a route from routing table (240) based on the destination IP address and then once more hands the packet over to set-up decision unit (245).

The processing procedure of connection set-up decision unit (245) will be described with reference to FIG. 15. This procedure is fundamentally the same as in the case of FIG. 1 (FIG. 3), but differences arise depending on whether the home node is on the source-side or destination-side of the cut-through connection that is sought to be set up, and depending on whether the handed-over packets are from the packet reception unit (243) or from the packet transfer analysis unit (242).

If the home node is source-side, the procedure is the same as FIG. 1. If the home node is destination-side, the procedure is the same as FIG. 12.

Last, packets from packet reception unit (243) are handed over to packet transfer analysis unit (242), while packets from analysis unit (242) are handed over to packet transmission unit (244), respectively.

In response to an instruction from decision unit (245), connection set-up unit (248) transmits a set-up initiation message toward the destination node or a connection request message toward the source node. The procedure in the former case is the same as FIG. 1, and in the latter case is the same as FIG. 12.

Routing table (240), routing table update unit (241), timer (246) and connection status table (247) are the same as in FIG. 1.

Considering a example of a network configuration as shown in FIG. 5, in this case, if CSR1 (202) and CSR3 (104) are both constituted as shown in FIG. 14, a trigger can be detected by either of CSR1 (202) or CSR3 (204). Also, in this case, both packets going in the direction of the client (204) and those going in the direction of the server (202) can serve as the trigger.

Figure 15:
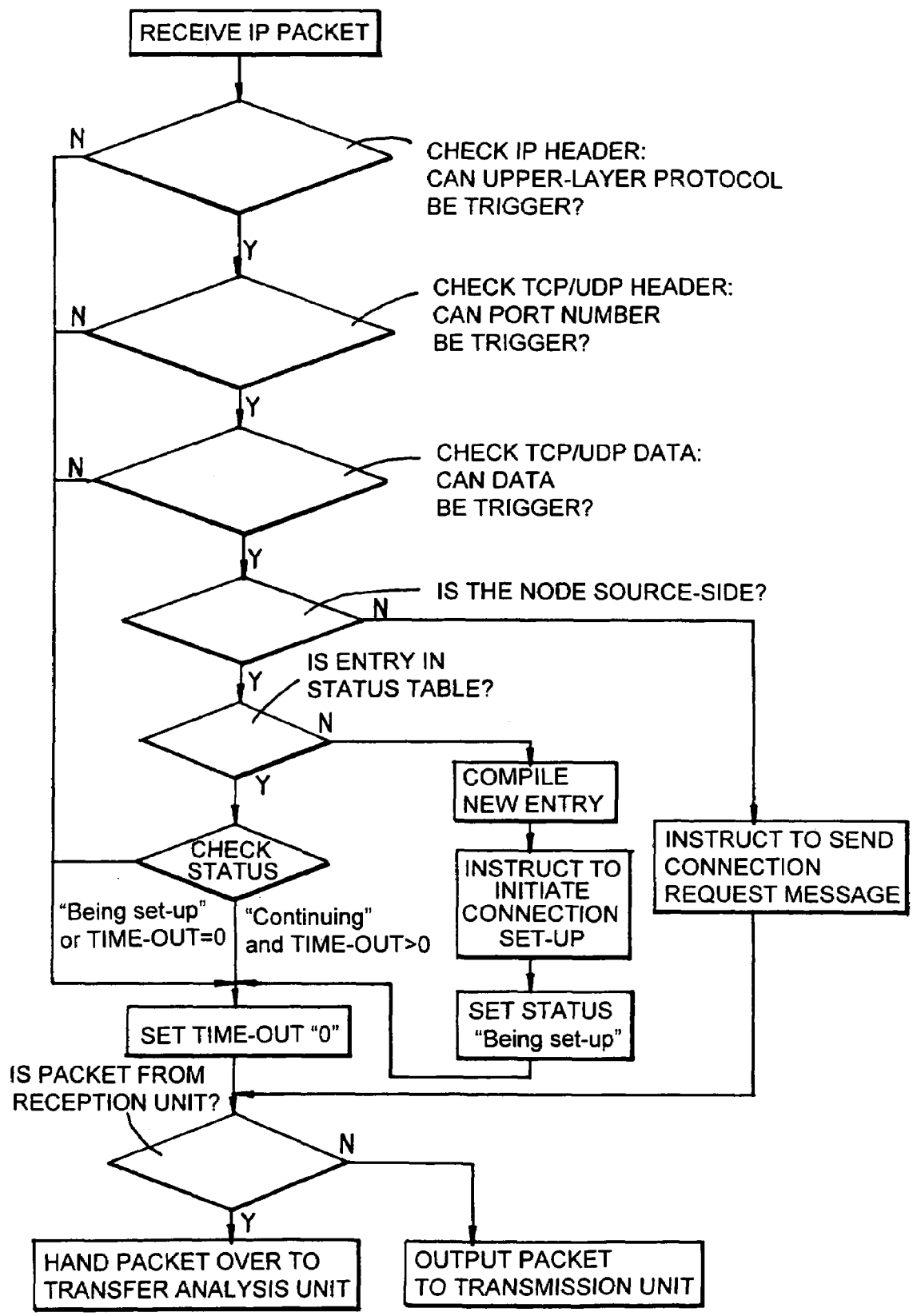
FIG. 15 is a flow chart showing a procedure for initiating a set-up of a cut-through connection by the node of FIG. 14.

It should be noted, in cases (I) to (IV) respectively or in combination, that the connection set-up decision procedure shown in FIGS. 3 and 15 can be modified. For example, in these figures, the source/destination port of transport-layer header of every packet handed over is checked before checking the connection status table. In contrast, there may be an alternative method that the connection status table is first checked, and that the check of whether the packet is a trigger or not is performed only when the corresponding cut-through connection has not been set up yet.

In this method, if the corresponding cut-through connection established is found by the first check of the connection status table, only the setting of the time-out count to "0" is performed. As a result, in this case, once the cut-through connection is established according to the trigger, it will not be released so far as traffic to the corresponding destination address continues, even though the packet in the traffic does not satisfy the condition to be the trigger.

In other words, the method in FIGS. 3 and 15 is intended for establishing and releasing a cut-through connection according to the same policy, while the alternative method is intended for releasing under a more relaxed condition than establishing. It is also possible to provide releasing mechanism separate from the trigger detection and cut-through set-up operation.

It should be also noted that traffic to which a cut-through connection is dedicated can be decided arbitrarily. For example, a cut-through connection is dedicated to traffic to a specific destination IP address in the above description. It can also be set up dedicated to traffic from a specific source address to a specific destination address, or to traffic destined to a specific network mask of destination node, or to traffic which has a specific IPv6 flow ID, or to traffic destined to a specific destination address and port, and so on. In each case, an entry of the connection status table and the routing table is provided and checked for every traffic to which a cut-through connection is dedicated.

Case for NHRP

Another example in which this invention is applied to cut-through connection set-up using NHRP is described below.

Figures 16, 17:
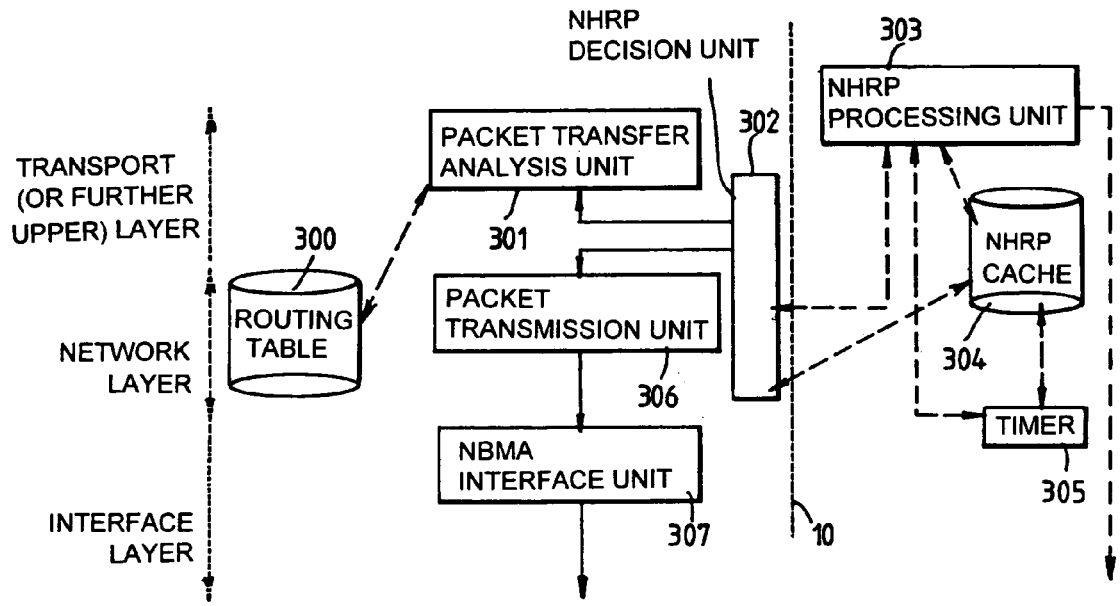
FIG. 16 is a schematic functional block diagram showing a configuration of one NHRP embodiment of a packet transmission node according to the present invention.
FIG. 17 is a diagrammatic illustration of an NHRP cache, which is used by the operations of the node of FIG. 16.

FIG. 16 illustrates a functional block diagram for performing the packet transfer and NHRP processing in an NHRP client. The NHRP client is the packet transmission node and can be either a host or a router (packet transfer node). In FIG. 16, continuous lines indicate the flow of packets and broken lines indicate the flow of control information.

Packet transfer analysis unit (301) accepts output packets from the node's own upper layer or packets received from other nodes, and finds a route from routing table (300) based on the destination IP address, and hands the packet over to NHRP decision unit (302).

NHRP decision unit (302), if a packet transmission interface is NBMA (Non-Broadcast Multiple Access), examines the packet and NHRP cache (304) and, if necessary, gives an instruction to NHRP processing unit (303) for outputting a Next-Hop Resolution (NHR) request.

NHRP cache (304) in FIG. 16 is constituted as shown in FIG. 17. Note that, in FIG. 17, only the fields required by the decision unit (304) are illustrated. Apart from these fields, there can be fields of information obtained from the NHR response (e.g. next-hop NBMA address etc.).

When the cache (304) is examined, the destination IP address is used as a key. Either the destination IP address itself or the IP address of the router nearest to the destination, which is included in the NHR responce, is entered into the next-hop IP address field. During the period from output of an NHR request up to reception of an NHR response, "incomplete" is entered into this field. If a negative response is received, "insolvable" is entered into this field.

The "time-out count" field is periodically updated by timer (305), which will be described later. This field, for an entry whose next-hop IP address is "incomplete", means that no response has obtained during the period proportional to the number and, for an entry other than this, means that a time indicated by the number has elapsed since a response was obtained.

The "lifetime" field displays a predetermined number. If the value of the time-out count field gets bigger than the value of this field, the entry is erased.

Figure 18:
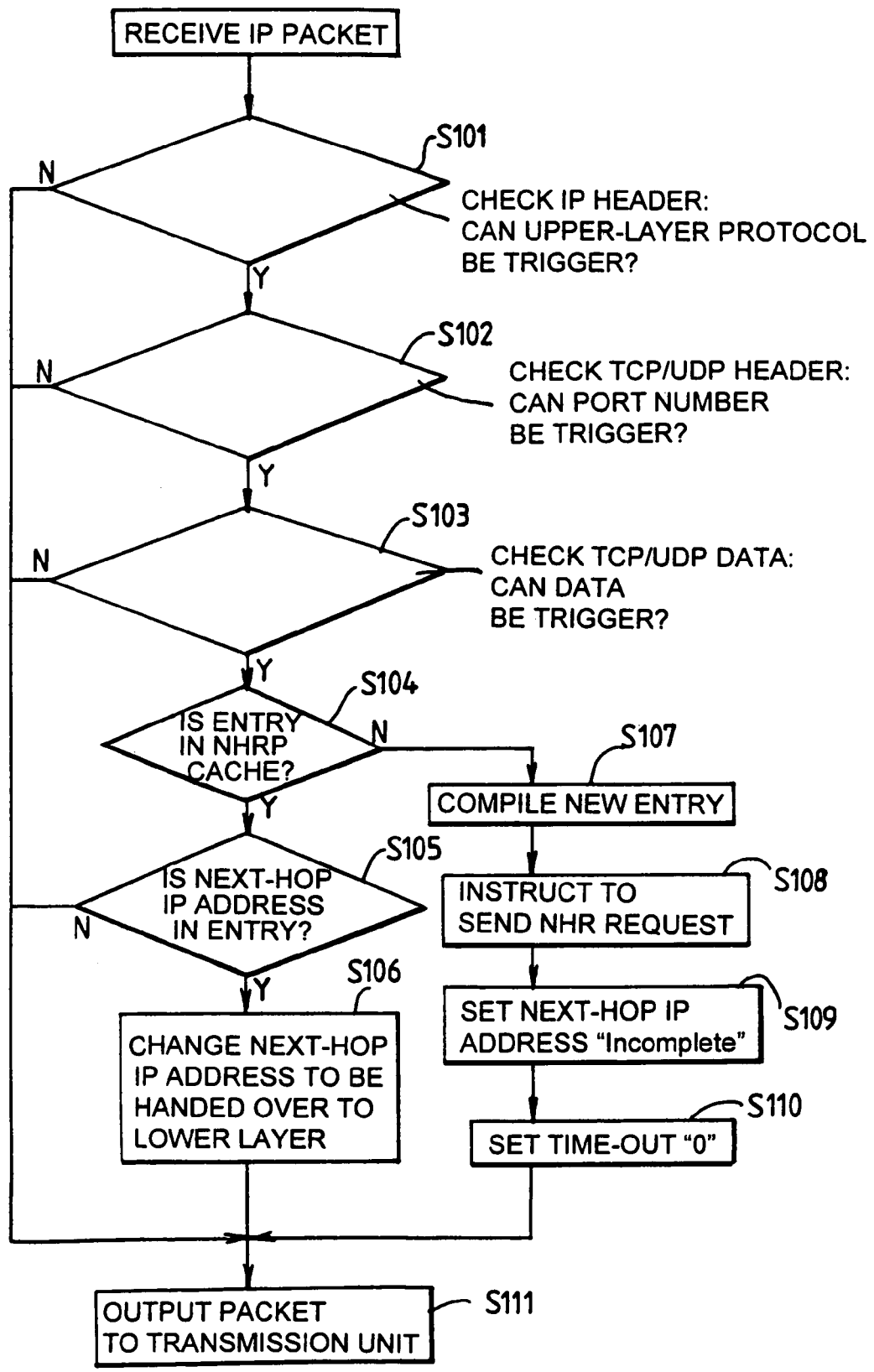
FIG. 18 is a flow chart showing a procedure for initiating a set-up of a cut-through connection by the node of FIG. 16.

FIG. 18 shows a procedure for initiating cut-through connection set-up operation using the NHRP cache. The steps S103 and S101 in the figure are optional as described referring to FIG. 3.

First of all, NHRP decision unit (302) examines the upper-layer protocol field in the IP header (S101). If the result (e.g. TCP or UDP) is a protocol that can trigger a cut-through connection set-up (S101 Yes), it checks at least one of the source port field and the destination port field of the upper-layer protocol header (S102). If the examined protocol is one which cannot act as a trigger (S101 No), the packet is transmitted ordinarily.

If the result of checking the source or destination port field in the TCP/UDP header of the packet shows that the packet is to act as a trigger for a cut-through connection set-up (S102 Yes), if required by the system's policy, a further check is performed on the TCP/UDP data field (S103). If the checked packet is not to trigger a cut-through connection set-up (S102 No or S103 No), the packet is transmitted ordinarily.

If, as a result, it is decided that the packet is suitable for a cut-through transfer (S102 Yes or S103 Yes), NHRP cache (304) is examined (S104).

If, as a result of the examination of cache (304), it is found that there is no entry in respect of the destination IP address of this packet, a new entry is compiled in cache (304) with the condition "incomplete" and the time-out count "0" (S107, S109, S110), and NHRP processing unit (303) is instructed to issue an NHR request (S108).

On the other hand, if an entry is present in the cache and the IP address has been entered into the next-hop IP address field (S105 Yes), the decision unit (302) hands the entered IP address over to packet transmission unit (306) as the next-hop IP address (S106). If the next-hop IP address field is "incomplete" or "insolvable" (S105 No), a next-hop IP address obtained from routing table (300) is ordinarily handed over to packet transmission unit (306).

After the above processing, packet transmission unit (306) hands over the selected next-hop IP address, together with the packet to be transmitted, to NBMA interface (307)(S111).

NBMA interface (307) has the correspondence between IP addresses including IP addresses obtained by the NHR response and connections including cut-through connections established based on the obtained IP addresses, and transmits the packet through a connection corresponding to the IP address handed over the transmission unit (306). Consequently, if a cut-through connection has been established according to NHRP, the packet is transmitted through this cut-through connection; otherwise, it is sent by the ordinary route obtained from routing table (300).

The remaining elements of FIG. 16 will now be described. On receipt of an instruction from the decision unit (302) at the step S108, NHRP processing unit (303) issues an NHR request to the next-hop server. In NHRP, this NHR request corresponds to a set-up initiation message.

If the node receives an affirmative response from the server, NHRP processing unit (303) establishes a connection to the IP address which is included in the NHR response, and enters the IP address into the next-hop IP address field of cache (304). If it receives a negative response, it enters "insolvable" into the next-hop IP address field. In either case, the time-out count is set to 0, and the lifetime is set to the value calculated based on the value entered into a holding time field of the NHR response.

Timer (305) is actuated at intervals of a fixed time in order to check whether or not the cached information is still valid, or in order to determine whether or not the NHR request is to be resent. Then, if necessary, the timer updates the cache (304).

Figure 19:
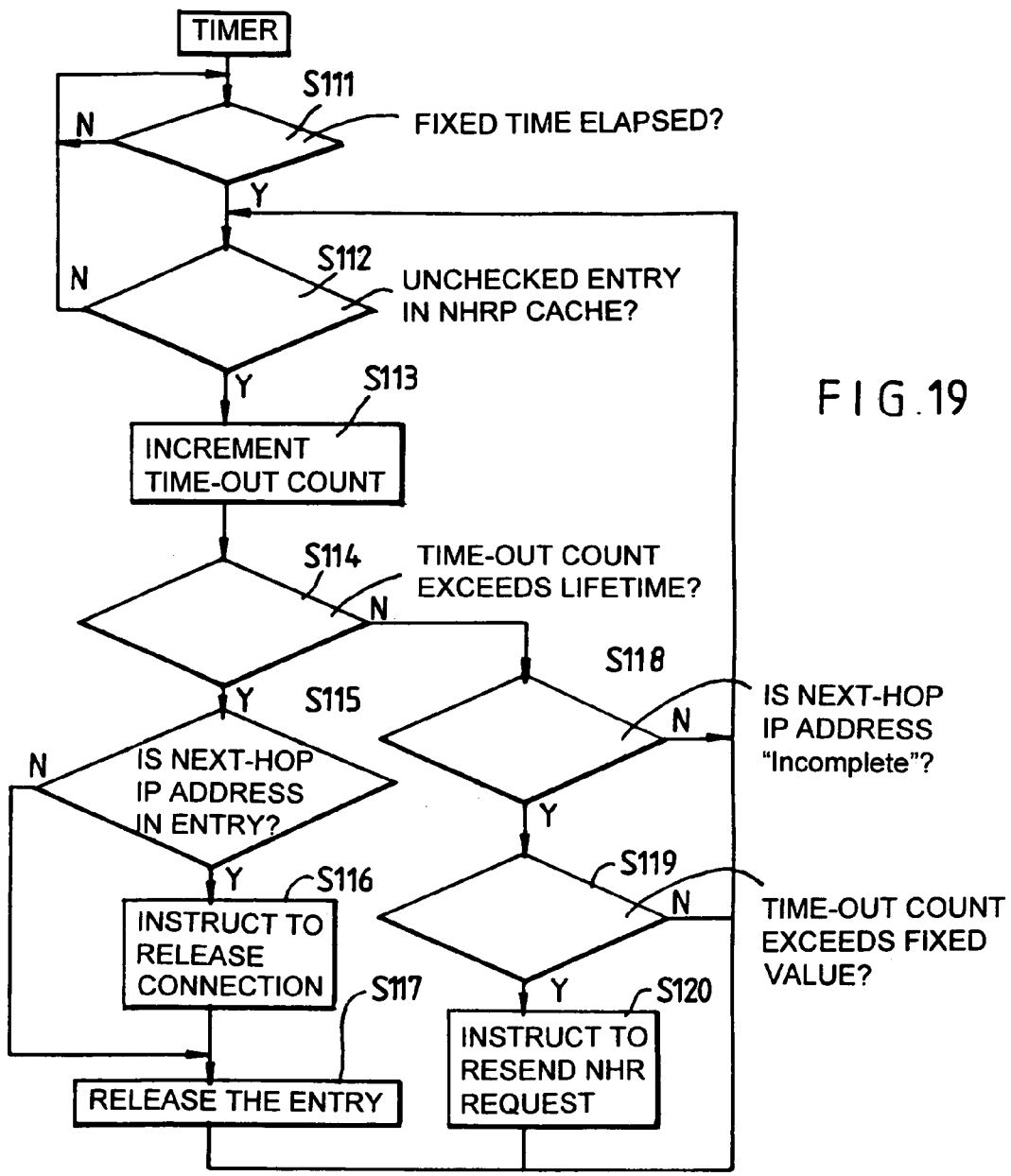
FIG. 19 is a flow chart showing a procedure of the timer.

The operating procedure of the timer is shown in FIG. 19. First of all, for each entry of cache (304), it increases the "time-out count" field by the prescribed number (S113). This prescribed number can be different for each entry or can be the same.

For every entry, if the time-out count becomes more than the lifetime count (S114 Yes), that entry is deleted (S117). If the deleted entry is one wherein a specific IP address is in the next-hop IP address field (S115 Yes), an instruction is given to NHRP processing unit (303) to release the corresponding cut-through connection (S116). If the time-out count has not been exceeded by the lifetime count (S114 No) and if the entry is one wherein the next-hop IP address field is "incomplete" (S118 Yes), every time the time-out count reaches a fixed value (which may be different for each entry or the same) (S119 Yes), the NHRP processing unit (303) is instructed (S120) to resend an NHR request.

In this NHRP case also, what kind of packets to be adopted as the triggers for a cut-through connection set-up may be determined based on experience. This includes the case where the user of the connection sets the kind of packets manually each time. In contrast, the kind of packets to act as trigger can be determined using some kind of quantitative statistical information. In the latter method, a procedure can be employed identical with that already described in 'Packet to be a Trigger'.

Hereinafter, an example will be described where a cut-through connection for traffic from an FTP server to an FTP client is set up, triggered by an arbitrary data packet from the FTP server to the FTP client. Note that application to other cases can be performed in the same way in the present case, as described in 'Packet to be a Trigger'.

Figure 20:
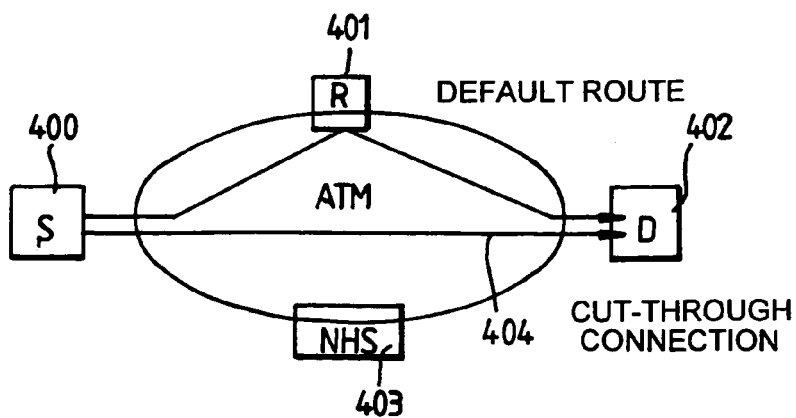
FIG. 20 is a diagram of a network configuration example using NHRP.

FIG. 20 is a diagram of an example of a network configuration according to NHRP. In this Figure, S (400) is an FTP server, D (402) is an FTP client, R (401) is a router and NHS (403) is a next-hop server.

S (400) is constructed as shown in FIG. 16. Ordinarily, packets destined for D (402) will be sent to R (401) where they are subjected to IP processing and then transferred to D (402), as shown as a default route. However, if an FTP data packet is output from S (400), NHRP decision unit (302) recognizes this packet as a trigger, and issues an NHR request to NHS (403). Then, S (400) receives an NHR response from NHS (403), finds that the next-hop is D (402) and D's ATM address, and sets up a cut-through connection to D (402). Then, subsequent traffic from S (400) to D (402) is transferred through the cut-through connection, without passing R (401).

It should be noted that the variations described in CSR cases are also possible to be applied to this NHRP case. For example, R (401) in FIG. 20 can operate like a router (packet reception node) in case (IV). In this example, S (400) transmits every packet by the default route first. If a transmitted packet is a trigger packet, R (401) receives and detects the trigger, while transferring the packet to D (402). Then, R (401) sends a connection request message to S (400), so that S (400) can send an NHR request (a set-up initiation message) to NHS (403). After S (400) establishes a cut-through connection to D (402) according to the above-mentioned procedure, every packet from S(400) to D (402) is transferred through the cut-through connection. The release of the cut-through connection is performed by S (400), where R (401) does not participate.

Another Example of a Trigger

The system which employs the source/destination information of the transport layer for detecting a trigger to initiate a cut-through connection set-up is described above. Now, the system which uses the source/destination information of the network layer will be described in detail.

Figure 21:
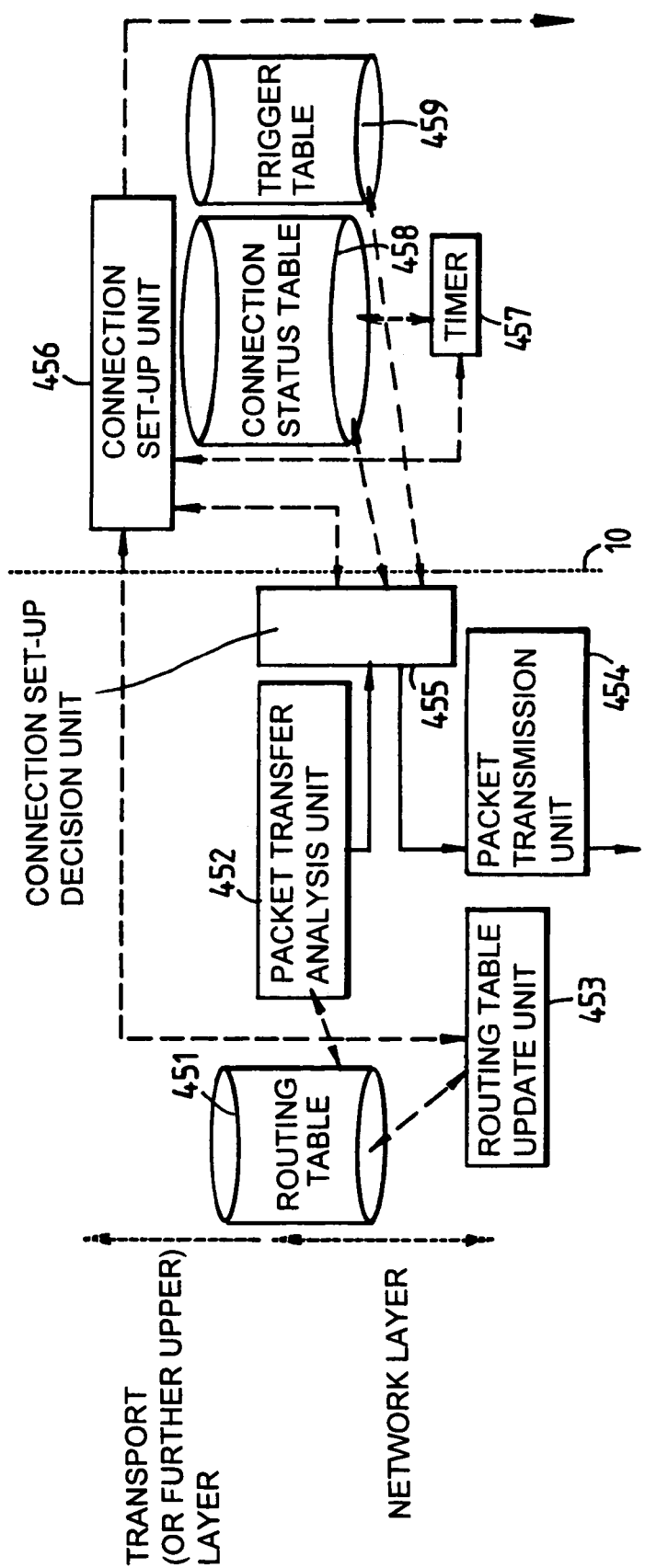
FIG. 21 is a schematic functional block diagram showing a configuration of another embodiment of a packet transmission node according to the present invention.

The first example corresponds to case (I) for CSR. FIG. 21 shows a functional block diagram for performing the packet transfer according to CSR technology in a packet transmission node. The structure shown in this figure is almost the same as that of FIG. 1, but differs in that the connection set-up decision unit (455) does not use information of the transport or further upper layer and in that a trigger table (459) is added.

Trigger table (459) is a list of specified IP addresses that can act as triggers. That is, a packet whose source is an IP address that appears on this list triggers set-up of a cut-through connection directed to the destination of the packet. This list may include for example IP addresses of the servers of services like FTP, HTTP, NNTP, NFS etc. which are frequently accessed.

A packet whose destination is an IP address included in the list can also trigger set-up of a cut-through connection directed to the destination. In this case, the list may include IP addresses of clients that are guaranteed priority treatment (e.g. clients receiving a QoS guaranteed service).

FIG. 22 shows a procedure for initiating a cut-through connection set-up. Using trigger table (459), connection set-up decision unit (455) first of all checks at least one of the source and the destination IP addresses in the IP header of an IP packet that is input from packet transfer analysis unit (452)(S201). If as a result trigger table (459) indicates that the checked IP address can trigger a cut-through connection set-up (S201 Yes), it executes the same processing as S4 and the following steps of FIG. 3 (S202 and the following steps).

Figure 23:
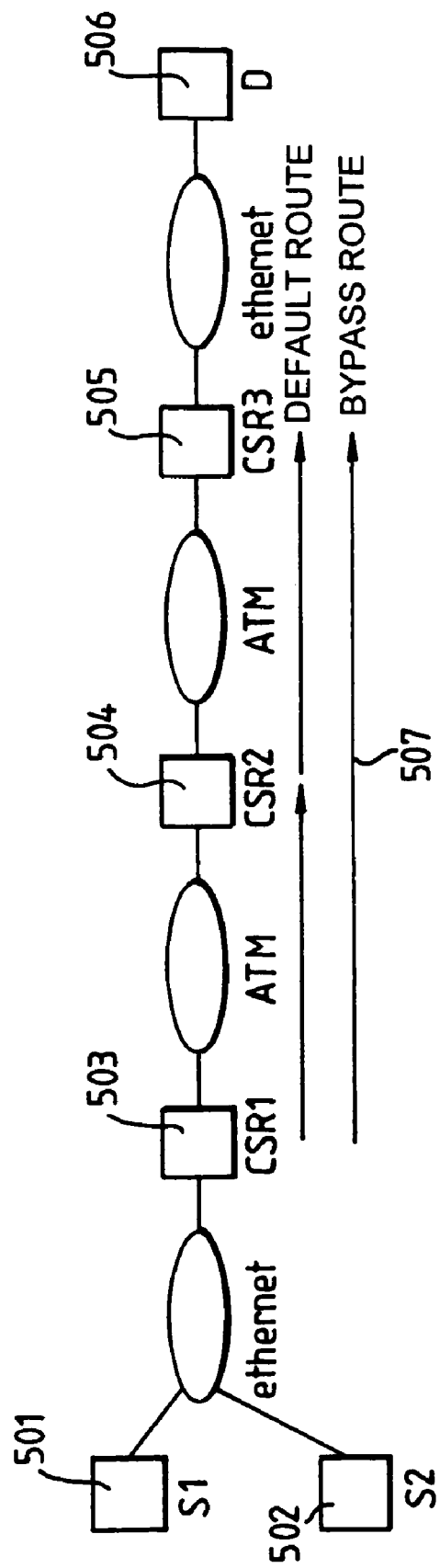
FIG. 23 is a diagram of another network configuration example including CSR.

The case where a cut-through connection for traffic from an FTP server to an FTP client is set up triggered by an arbitrary packet from the specified FTP server will now be described, considering a network configuration shown in FIG. 23. In this Figure, S1 (501) is the specified FTP server. This is a large server that is frequently accessed, thus a packet from this is designated as a trigger for cut-through connection.

S2 (502) is a host, D (506) is an FTP client, and CSR1 (503), CSR2 (504), and CSR3 (505) are routers acting as CSRs. CSR1 and CSR3 serve to connect an ethernet and an ATM network which are logical networks, and CSR2 connects ATM networks.

In the present case, CSR1 (503) detects a trigger. CSR1 examines the source IP address of the packet to be transferred and if the source of the packet is S1 (501), initiates a set-up action of a cut-through connection destined to the destination of the packet.

Consequently, whilst packets only from S2 (502) to D (506) are flowing, packets to D are transferred by the default route. However, when a packet is sent from S1 to D, the packet is recognized by CSR1 to trigger the setting up of bypass route (507). Once this bypass route is set up, subsequent packets destined for D are transferred using this bypass route.

It should be noted that the bypass route can be established dedicatedly to the traffic from S1 to D. If so, after the bypass route is setup, subsequent packets from S1 to D are transferred through the bypass route and other packets to D (including those whose source is S2) are transferred by the default route. To implement this, routing table (451) and connection status table (458) provide each entry with the source IP address and the destination IP address, and are checked using the combination of source and destination IP addresses as a search-key.

In the present case, it is not guaranteed that a packet adopted as trigger was in fact an FTP packet, but the similar effect is expected because the packet is from a server that is frequently accessed. The additional benefit of simplification of the processing may also be expected since information of the transport layer or upper layers is not required to be processed.

The method indicated here is compatible with methods utilizing information of the transport layer or upper layers, and in fact both methods can be used in combination. In such a case, the processing of S201 in FIG. 22 is performed before, after, or during, the processing of S1 to S3 in FIG. 3. According to this method, for example, a cut-through connection can be set up triggered by an FTP data packet from a frequently accessed (specified) FTP server.

Figure 24:
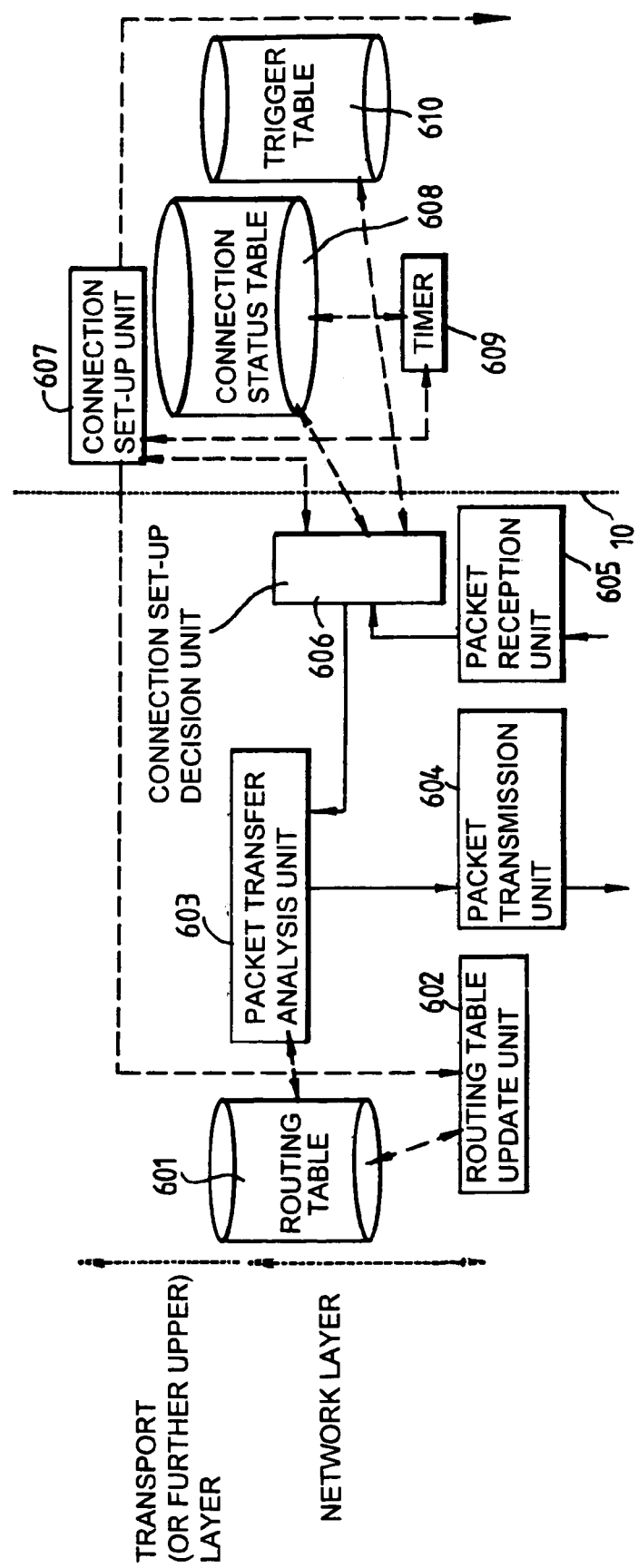
FIG. 24 is a schematic functional block diagram showing a configuration of another embodiment of a packet transmission node according to the present invention.

The second example corresponds to case (II) for CSR. FIG. 24 shows a functional block diagram for performing the packet transfer according to CSR protocol in a packet transmission node. The structure is almost the same as that of FIG. 11, but differs in that information of the transport or further upper layer is not used by connection set-up decision unit (606) and that a trigger table (610) is added.

The cut-through connection set-up procedure in the second example is identical with that of the first example with the exception that the direction of the packet constituting the trigger and the direction of the cut-through connection to be established are opposite; in other words, the cut-through connection is set up towards the source of the packet constituting the trigger. After the processing as far as S204 of FIG. 22 has been completed, the packet is handed over to packet transfer analysis unit (603).

This second example will now be described below with reference to FIG. 23, assuming that the network configuration is the same as in the first example. CSR1 (503) examines the destination IP address of the received packet to detect a trigger. If it finds that the destination of the packet is S1 (501), commences the cut-through connection set-up action towards the source of the packet.

Consequently, so long as packets only from D (506) to S2 (502) are flowing, a cut-through connection is not set up, and packets to D are transferred by the default route. However, when a packet is sent from D to S1, the packet is recognized by CSR1 to trigger the set-up of a bypass route (507). Once the bypass route has been set up, subsequent packets destined for D (if not dedicatedly, all packets to D and, if dedicatedly only packets from S1 to D) are transferred using this bypass route.

The foregoing can be implemented in the same way for both CSR (III) and (IV). Specifically, as described above, a trigger table is added and network-layer information is used in detection instead of transport-layer information, in either case.

These examples also are compatible with the use of information of the transport layer or upper layers, and can be utilized in combination with that as already described.

Figure 25:
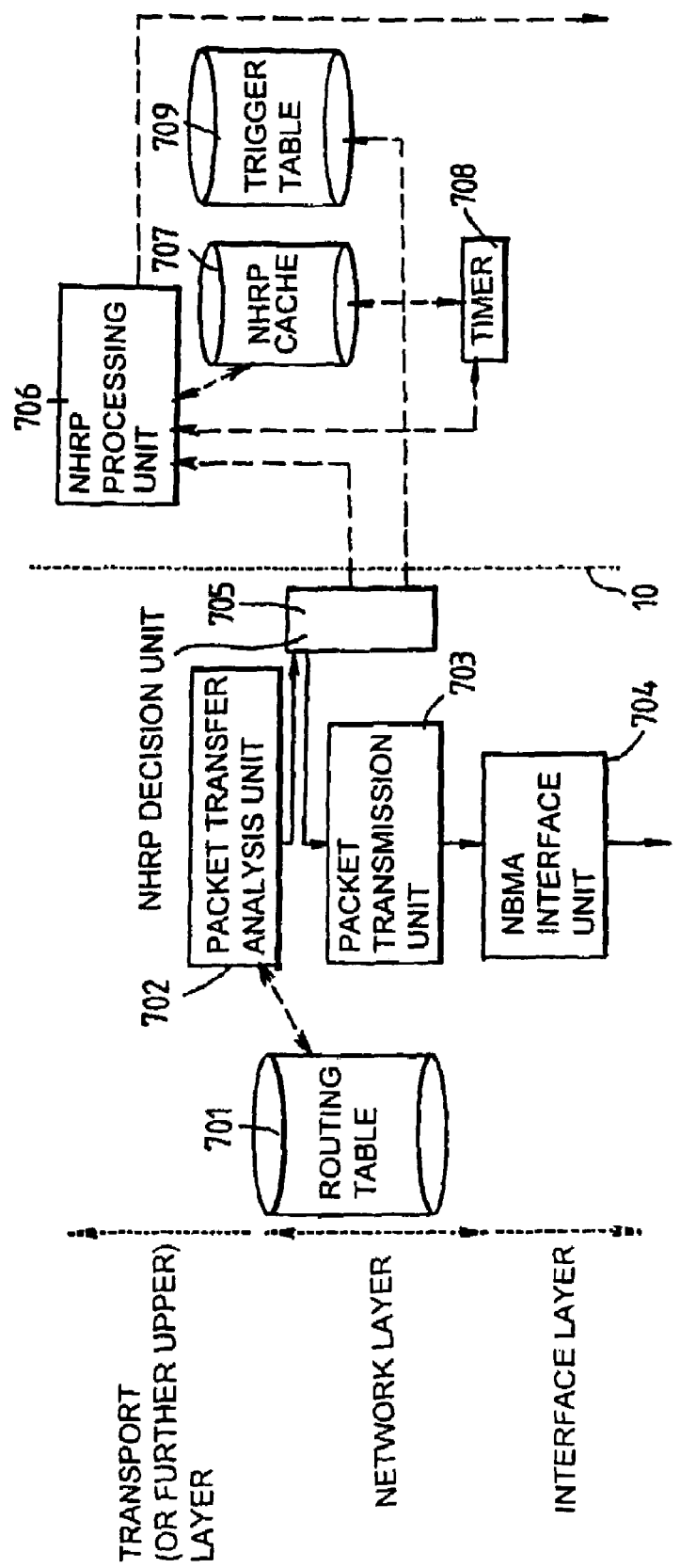
FIG. 25 is a schematic functional block diagram showing a configuration of another NHRP embodiment of a packet transmission node according to the present invention.

The next example corresponds to the case of NHRP. FIG. 25 shows a functional block diagram for performing the packet transfer and NHRP processing in an NHRP client. This is constructed in almost the same way as in FIG. 16, but differs in that NHRP decision unit (705) does not process information of the transport layer or upper layers and that there is added a trigger table (709).

The trigger table (709) has a list of specified IP addresses that act as triggers. Specifically, a packet which includes an IP address specified by the list will act as a trigger for issuing an NHR request in respect of the destination of that packet to the next-hop server. There are, as examples of IP addresses to be placed on the list, IP addresses of the servers which provide frequently accessed services like FTP, HTTP, NNTP or NFS etc., or those of the clients that are guaranteed priority treatment (e.g. clients receiving QoS guaranteed service).

Figure 26:
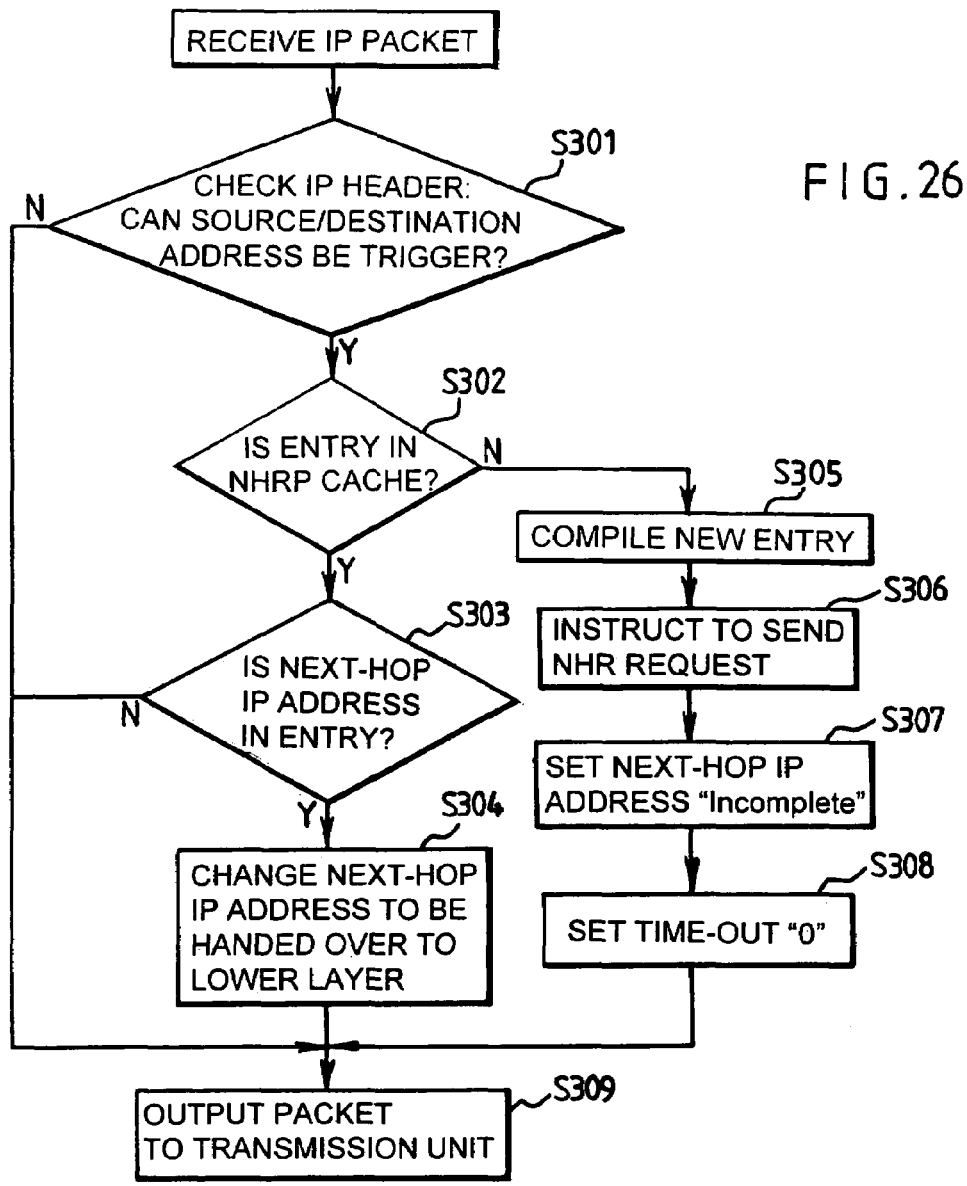
FIG. 26 is a flow chart showing a procedure for initiating a set-up of a cut-through connection by the node of FIG. 25.

FIG. 26 shows a procedure for initiating a cut-through connection set-up. NHRP decision unit (705) first of all checks at least one of the source and the destination IP address fields in the IP header of an IP packet input from packet transfer analysis unit (702), with reference to trigger table (709) (S301). If, as a result, it finds that this is a packet that can serve as a trigger for a cut-through connection (S301 Yes), it executes the processing of S302 and the subsequent steps. This processing is the same as the processing of S104 and the subsequent steps in FIG. 18.

This example is also compatible with a method utilizing information of the transport layer or upper layers. If both methods are required, to be used in combination, the processing of S301 of FIG. 26 would be performed before or after, or during, the processing from S101 to S103 in FIG. 18.

Figure 27:
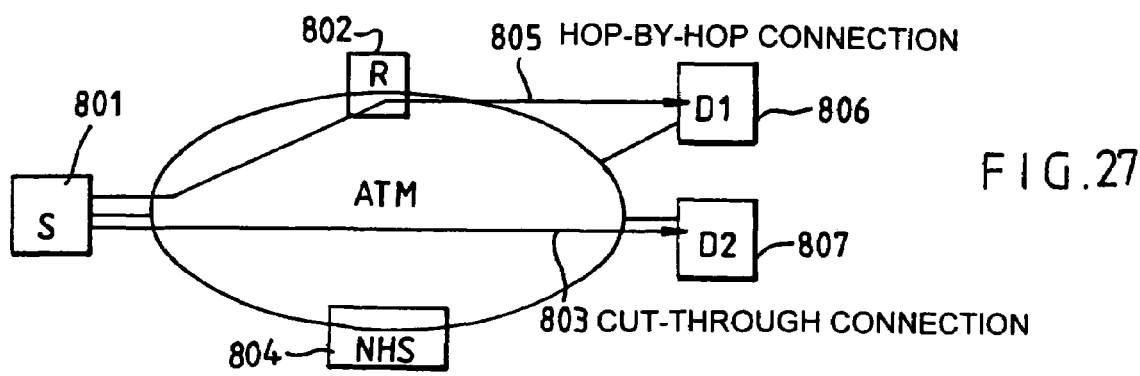
FIG. 27 is a diagram of another example network configuration example using NHRP.

This example will now be described below with reference to a network configuration of FIG. 27, where a cut-through connection is set up only for specific clients in a given FTP server. In this Figure, S (801) is an FTP server, D1 (806) and D2 (807) are FTP clients, R (802) is a router and NHS (804) is a next-hop server.

Let us now assume that S (801) is constituted as shown in FIG. 25 and the trigger table (459) of S contains the IP address of D2 as the specified destination (client) IP address. Consequently, while a packet from S to D1 continues to be sent by hop-by-hop connection (806), a packet from S to D2 is recognized by NHR decision unit (705), which then issues an NHR request to NHS (804). Since it receives an NHR response from NHS, finds that the next hop is D2, and also knows D2's ATM address, S sets up a cut-through connection (803) to D2, so that subsequent traffic from S to D2 is transferred by this cut-through connection.

In every example shown above, which trigger to be selected for establishing a cut-through connection can be decided by experience, or the selection can be based on some sort of quantitative statistical information in the same way as already described.

It should be noted that the trigger table can be provided respectively for source IP addresses and destination IP addresses. Then, the source IP address field of the input packet is compared with the source trigger table and the destination IP address field of the packet is compared with the destination trigger table. That is, the following four types of cut-through connections can be implemented: (1) for traffic from the specified source to an arbitrary destination; (2) for traffic from an arbitrary source to the specified destination; (3) for traffic either one of whose source and destination is the specified one; (4) for traffic from the specified source to the specified destination.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for setting up a cut-through connection through which packets from a source node belonging to a logical network to a destination node belonging to another logical network are transferred, bypassing network-layer processing at at least one boundary between logical networks, comprising the steps of:
   receiving a packet from the source node to the destination node or a packet from the destination node to the source node;
   detecting the received packet to be a trigger according to at least one of source information and destination information of a layer higher than the network layer included in the received packet; and
   instructing, in response to the detecting step, a node capable of initiating a set-up operation to initiate the set-up operation to establish the cut-through connection.

2. The method according to claim 1, wherein the detecting step includes examining information included in a source port field and/or a destination port field of a transport-layer header respectively as the source information and/or, the destination information of the layer higher than the network layer.

3. The method according to claim 1, wherein the detecting step includes examining information for identifing a protocol whose layer is higher than a transport layer used in the received packet as the source information and/or the destination information of the layer higher than the network layer.

4. The method according to claim 1, wherein the detecting step includes examining information included in a data field of the layer higher than the network layer for detecting the packet to be a trigger in addition to the source information and/or the destination information.

5. The method according to claim 1, wherein the detecting step includes checking a protocol whose layer is a transport layer used in the received packet for detecting the packet to be a trigger in addition to the source information and/or the destination information.

6. The method according to claim 1, wherein the detecting step further comprises the step of:
checking whether a cut-through connection corresponding to the received packet has already been set up or not.

7. The method according to claim 1, further comprising the step of:
transmitting the received packet through a default connection toward the destination node or the source node.

8. The method according to claim 1, further comprising the steps of:
buffering the received packet from the source node to the destination node until the cut-through connection becomes useable; and
transmitting the received packet through the cut-through connection.

9. The method according to claim 1, wherein in the receiving step, a receiving node receives the packet from one of the source node, the destination node, or an upper layer of the receiving node.

10. The method according to claim 1, wherein the instructing step occurs in the node capable of initiating the set-up operation.

11. The method according to claim 1, wherein the instructing step occurs in a node different from the node capable of initiating the set-up operation.

12. The method according to claim 1, wherein the instructing step includes instructing the node capable of initiating the set-up operation to send a set-up initiation message to a node located at a boundary between logical networks and neighboring on the node capable of initiating the set-up operation.

13. The method according to claim 12, wherein the set-up initiation message includes information to be used by the neighboring node for registering a correspondence relationship between a datalink connection in a logical network and another datalink connection in another logical network.

14. The method according to claim 1, wherein the instructing step includes instructing the node capable of initiating the set-up operation to send a set-up initiation message to a server which is capable of returning information to be used for establishing the cut-through connection.

15. The method according to claim 1, wherein the detecting step includes detecting the packet to be a trigger so that the statistical use rate of the cut-through connection to be established may exceed a predetermined rate.

16. A method for setting up a cut-through connection through which packets from a source node belonging to a logical network to a destination node belonging to another logical network are transferred, bypassing network-layer processing at at least one boundary between logical networks, comprising the steps of:
receiving a packet from the source node to the destination node or a packet from the destination node to the source node;
detecting the received packet to be a trigger according to at least one of source information and destination information of the network layer included in the received packet; and
instructing, in response to the detecting step, a node capable of initiating a set-up operation to initiate the set-up operation to establish the cut-through connection.

17. The method according to claim 16, further comprising the step of:
storing at least one address of a specified source node or a specified destination node; and wherein the detecting step detects the packet to be a trigger in case where at least one of the source information and the destination information is recognized to be in conformance with the address stored at the storing step.

18. The method according to claim 16, wherein the detecting step also uses at least one of source information and destination information of a layer higher than the network layer included in the received packet for detecting the packet to be a trigger.

19. A network node apparatus, comprising;
reception means for receiving a packet from a source node belonging to at least one logical network or an upper layer of the network node to a destination node belonging to another logical network;
detection means for detecting the packet received by the reception means to be a trigger according to at least one of source information and destination information of a network layer and/or a layer higher than the network layer included in the packet received;
set-up means for initiating, when the detection means detects the trigger, a set-up operation to establish a cut-through connection through which packets from the source node to the destination node are transferred, bypassing network-layer processing at at least one boundary between logical networks; and
transmission means for transmitting packets destined to the destination node through the cut-through connection established according to the set-up operation initiated by the set-up means.

20. A network node apparatus, comprising;
reception means for receiving a packet from a destination node belonging to at least one logical network to a source node belonging to another logical network or an upper layer of the network node;
detection means for detecting the packet received by the reception means to be a trigger according to at least one of source information and destination information of a network layer and/or a layer higher than the network layer included in the packet received;
set-up means for initiating, when the detection means detects the trigger, a set-up operation to establish a cut-through connection through which packets from the source node to the destination node are transferred, bypassing network-layer processing at at least one boundary between logical networks; and
transmission means for transmitting packets destined to the destination node through the cut-through connection established according to the set-up operation initiated by the set-up means.

21. A network node apparatus, comprising;
first reception means for receiving a packet from a destination node belonging to at least one logical network or an upper layer of the network node to a source node belonging to another logical network;
detection means for detecting the packet received by the first reception means to be a trigger according to at least one of source information and destination information of a network layer and/or a layer higher than the network layer included in the packet received;
instruction means for instructing, when the detection means detects the trigger, a node capable of initiating a set-up operation to initiate the set-up operation to establish a cut-through connection through which packets from the source node to the destination node are transferred, bypassing network-layer processing at at least one boundary between logical networks; and second reception means for receiving packets transferred through the cut-through connection.

22. A network node apparatus, comprising;

first reception means for receiving a packet from a source node belonging to at least one logical network to a destination node belonging to another logical network or an upper layer of the network node;

detection means for detecting the packet received by the first reception mean to be a trigger according to at least one of source information and destination information of a network layer and/or a layer higher than the network layer included in the packet received;

instruction means for instructing, when the detection means detects the trigger, a node capable of initiating a set-up operation to initiate the set-up operation to establish a cut-through connection through which packets from the source node to the destination node are transferred, bypassing network-layer processing at at least one boundary between logical networks; and second reception means for receiving packets transferred through the cut-through connection.

* * * * *